(12) United States Patent
Matsushita et al.

(10) Patent No.: US 10,755,080 B2
(45) Date of Patent: Aug. 25, 2020

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventors: Masahiro Matsushita, Yokohama (JP); Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 241 days.

(21) Appl. No.: 15/985,364

(22) Filed: May 21, 2018

(65) Prior Publication Data
US 2018/0341803 A1 Nov. 29, 2018

(30) Foreign Application Priority Data
May 23, 2017 (JP) ................................. 2017-101743

(51) Int. Cl.
*G06K 9/00* (2006.01)
*G06F 16/73* (2019.01)
(Continued)

(52) U.S. Cl.
CPC ......... *G06K 9/00228* (2013.01); *G06F 16/00* (2019.01); *G06F 16/5838* (2019.01);
(Continued)

(58) Field of Classification Search
CPC .. G06F 16/532; G06F 16/583; G06F 16/5838; G06F 16/5854; G06F 16/732;
(Continued)

(56) References Cited

U.S. PATENT DOCUMENTS

| 2007/0237387 A1 | 10/2007 | Avidan et al. | 382/159 |
| 2012/0321145 A1 | 12/2012 | Saito et al. | 382/118 |

(Continued)

FOREIGN PATENT DOCUMENTS

| CN | 1360266 A | 7/2002 | G06F 17/30 |
| CN | 1916931 A | 2/2007 | G06K 9/00 |

(Continued)

OTHER PUBLICATIONS

Zhong Wu et al, Scalable Face Image Retrieval with Identity-Based Quantization and Multi-Reference Re-Ranking, 2010 IEEE Conference on Computer Vision and Pattern Recognition (CVPR), Jun. 2010, pp. 3469-3476, 10.1109/CVPR.2010.5539976, Institute of Electrical and Electronics Engineers (IEEE), Piscataway, New Jersey, U.S.

(Continued)

*Primary Examiner* — Andrew W Johns
(74) *Attorney, Agent, or Firm* — Canon U.S.A., Inc. I.P. Division

(57) ABSTRACT

An information processing apparatus includes first and second acquisition units and first and second search units. The first acquisition unit acquires a first feature amount from a search source image including a search object. The first search unit searches for the search object from a plurality of video images based on the first feature amount acquired by the first acquisition unit. The second acquisition unit acquires a second feature amount from the search object searched by the first search unit. The second feature amount is different from the first feature amount. The second search unit searches, based on the second feature amount acquired by the second acquisition unit, the search object from a video image, among the plurality of video images, in which the search object is not searched by at least the first search unit.

27 Claims, 18 Drawing Sheets

(51) Int. Cl.
    *G06K 9/32* (2006.01)
    *G06F 16/583* (2019.01)
    *G06F 16/00* (2019.01)
(52) U.S. Cl.
    CPC ......... *G06F 16/73* (2019.01); *G06K 9/00362* (2013.01); *G06K 9/00744* (2013.01); *G06K 9/00771* (2013.01); *G06K 9/00892* (2013.01); *G06K 9/3241* (2013.01)
(58) Field of Classification Search
    CPC .. G06F 16/783; G06F 16/7837; G06F 16/784; G06F 16/7847; G06F 16/785; G06F 16/7854; G06K 9/00228; G06K 9/00268; G06K 9/00281; G06K 9/00362; G06K 9/00369; G06K 9/00744; G06K 9/00771; G06K 9/4671; G06K 9/4676; G06K 9/6202; G06K 9/629
    See application file for complete search history.

(56) References Cited

U.S. PATENT DOCUMENTS

2017/0068845 A1* 3/2017 Saito et al. ........ G06K 9/00281
2018/0181836 A1* 6/2018 Xie et al. ........... G06K 9/00771

FOREIGN PATENT DOCUMENTS

| JP | 2002373332 A | 12/2002 | ............... G06T 7/00 |
| JP | 2009199322 A | 9/2009 | ............... G06T 1/00 |
| JP | 2010165156 A | 7/2010 | |
| JP | 2013153304 A | 8/2013 | ............... H04N 7/18 |
| JP | 6202937 B2 | 9/2017 | |
| JP | 2018-041300 A | 3/2018 | ............. G06F 17/30 |

OTHER PUBLICATIONS

Liang Zheng et al, Person Re-Identification Meets Image Search, International Journal of Computer Vision, Feb. 7, 2015, pp. 4321-4330, https://arxiv.org/abs/1502.02171, Cornell University, Ithaca, New York, U.S.

Ondrej Chum et al, Total Recall: Automatic Query Expansion with a Generative Feature Model for Object Retrieval, IEEE 11th International Conference on Computer Vision, 2007, pp. 1-8, 10.1109/ICCV.2007.4408891, Institute of Electrical and Electronics Engineers (IEEE), Piscataway, New Jersey, U.S.

Wengang Zhou, Recent Advance in Content-based Image Retrieval: A Literature Survey, Jun. 19, 2017, 24 pages, arXiv:1706.06064 [cs.MM], IEEE 11th International Conference on Multimedia, Institute of Electrical and Electronics Engineers (IEEE), Piscataway, New Jersey, U.S.

Ning Zhang, Beyond Frontal Faces: Improving Person Recognition Using Multiple Cues, 2015 IEEE Conference on Vision and Pattern Recognition (CVPR), Jan. 23, 2015, pp. 1-10, arXiv:1501.05703 [cs.CV], , Institute of Electrical and Electronics Engineers (IEEE), Piscataway, New Jersey, U.S.

Ning Zhang; Beyond Frontal Faces: Improving Person Recognition Using Multiple Cues; 2015 IEEE Conference on Computer Vision and Pattern Recognition (CVPR), pp. 4804-4813.

A. Bedagkar-Gala et al; Part-based spatio-temporal model for multi-person re-identification; Pattern Recognition Letters, 2011, vol. 33, No. 14, pp. 1908-1915; Quantitative Imaging laboratory, University of Houston, Dept of Computer science, Houston, TX 77204-3010.

M. Farenzena et al ; Person Re-Identification by Symmetry-Driven Accumulation of Local Features; Proc. of CVPR, pp. 2360-2367 (2010).

Erik Murphy-Chutorian et al; Head pose estimation for driver assistance systems: A robust algorithm and experimental evaluation; Proc. IEEE Conf. Intelligent Transportation Systems, 2007, pp. 709-714.

Ziwei Liu et al; DeepFashion: Powering robust clothes recognition and retrieval with rich annotations; Proceedings of IEEE Conference on Computer Vision and Pattern Recognition (CVPR). 2016; pp. 1096-1104.

Shaoqing Ren et al; Faster R-CNN: Towards real-time object detection with region proposal networks; Computer Vision and Pattern Recognition 2015 pp. 1-14.

* cited by examiner

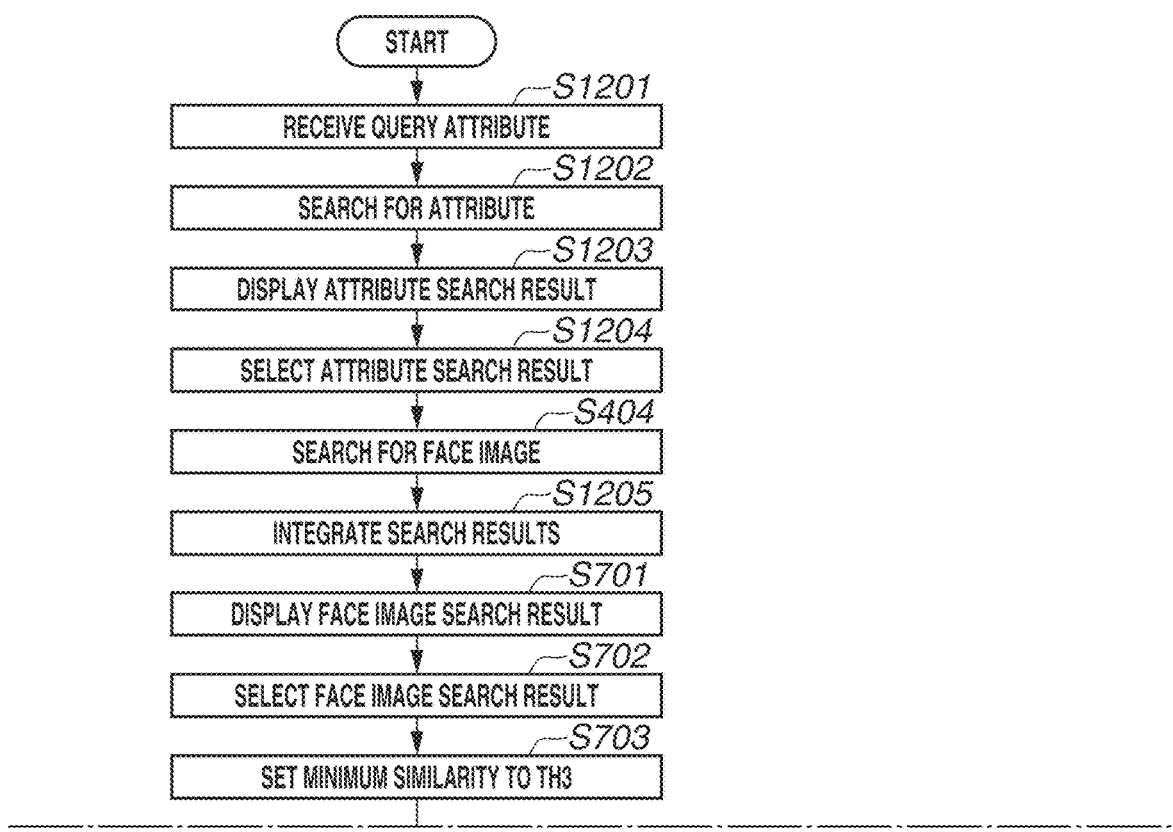

INFORMATION PROCESSING APPARATUS, INFORMATION PROCESSING METHOD, AND STORAGE MEDIUM

BACKGROUND OF THE INVENTION

Field of the Invention

The present disclosure relates to an information processing apparatus, an information processing method, and a storage medium which are suitable for use in accurately searching for an object.

Description of the Related Art

An apparatus configured to detect the face of a human figure from each frame of a video image to be monitored, calculate an image feature amount from the detected face, and accumulate the calculated image feature amount in association with the frame of the video image has heretofore been known as discussed in Japanese Patent Application Laid-Open No. 2013-153304. The apparatus is capable of comparing the accumulated image feature amount with the face of a human figure to be searched as a query and displaying a video image including the human figure. Japanese Patent Application Laid-Open No. 2009-199322 discusses an apparatus having a configuration in which not only the image feature amount of the face of a human figure, but also clothes information, such as the color and shape of clothes put on the human figure, and the like are stored and these pieces of information are used for search, to thereby achieve an accurate human figure search is also known.

M. Farenzena, L. Bazzani, A. Perina, V. Murino and M. Cristani: "Person Re-Identification by Symmetry-Driven Accumulation of Local Features", Proc. of CVPR, pp. 2360-2367 (2010) (hereinafter referred as Farenzena et. al.) discusses a technique in which feature amounts, such as the color and shape of clothes, are acquired from areas of human figures in video images captured by a plurality of cameras, and the acquired feature amounts are compared with each other to identify whether the human figures in the video images captured by the cameras are the same human figure. The use of the technique discussed in M. Farenzena et. al. allows tracking of a suspicious person or the like in the images captured by the plurality of cameras.

In the techniques discussed in Japanese Patent Application Laid-Open Nos. 2013-153304 and 2009-199322, the human figure search is carried out based on face images. However, many surveillance cameras are installed at a high place, such as on the ceiling, and thus some images captured by the cameras, such as an image of a top-down view and an image in which the size of each human figure is small, are not clear enough to recognize the face of each human figure in the images. For this reason, it is difficult for these techniques to search for a human figure included in video images captured by such cameras. On the other hand, the method described in M. Farenzena et. al. is capable of tracking a human figure using information obtained from the entire human figure, including the color and shape of clothes put on the human figure. However, by using only the method, it is difficult to discriminate a person wearing such clothes as a uniform, work clothes, or a suit, which is similar to that worn by other people around the person.

SUMMARY OF THE INVENTION

In view of the above-described issues, the present disclosure is directed to a technique capable of accurate search for an object of an interest by effectively combining the features of the object.

According to an aspect of the present invention, an information processing apparatus includes a first acquisition unit configured to acquire a first feature amount from a search source image including a search object, a first search unit configured to search for the search object from a plurality of video images based on the first feature amount acquired by the first acquisition unit, a second acquisition unit configured to acquire a second feature amount from the search object searched by the first search unit, wherein the second feature amount is different from the first feature amount, and a second search unit configured to search, based on the second feature amount acquired by the second acquisition unit, the search object from a video image, among the plurality of video images, in which the search object is not searched by at least the first search unit.

Further features of the present disclosure will become apparent from the following description of embodiments with reference to the attached drawings.

DESCRIPTION OF THE EMBODIMENTS

In a first embodiment of the present disclosure, face image features and human body image features are extracted from a series of images of a human figure obtained by tracking the human figure included in video images captured by surveillance cameras, and the face image features and the human body image features are associated and stored. A face image search is carried out based on a face image (search source image) given as a query (search source). After that, a human body image search is carried out using the human body image features registered in association with face images with a similarity to a face image search result being equal to or higher than a preliminarily set threshold. Further, the result of the human body image search is verified using face image features with high discriminability.

Figure 1:
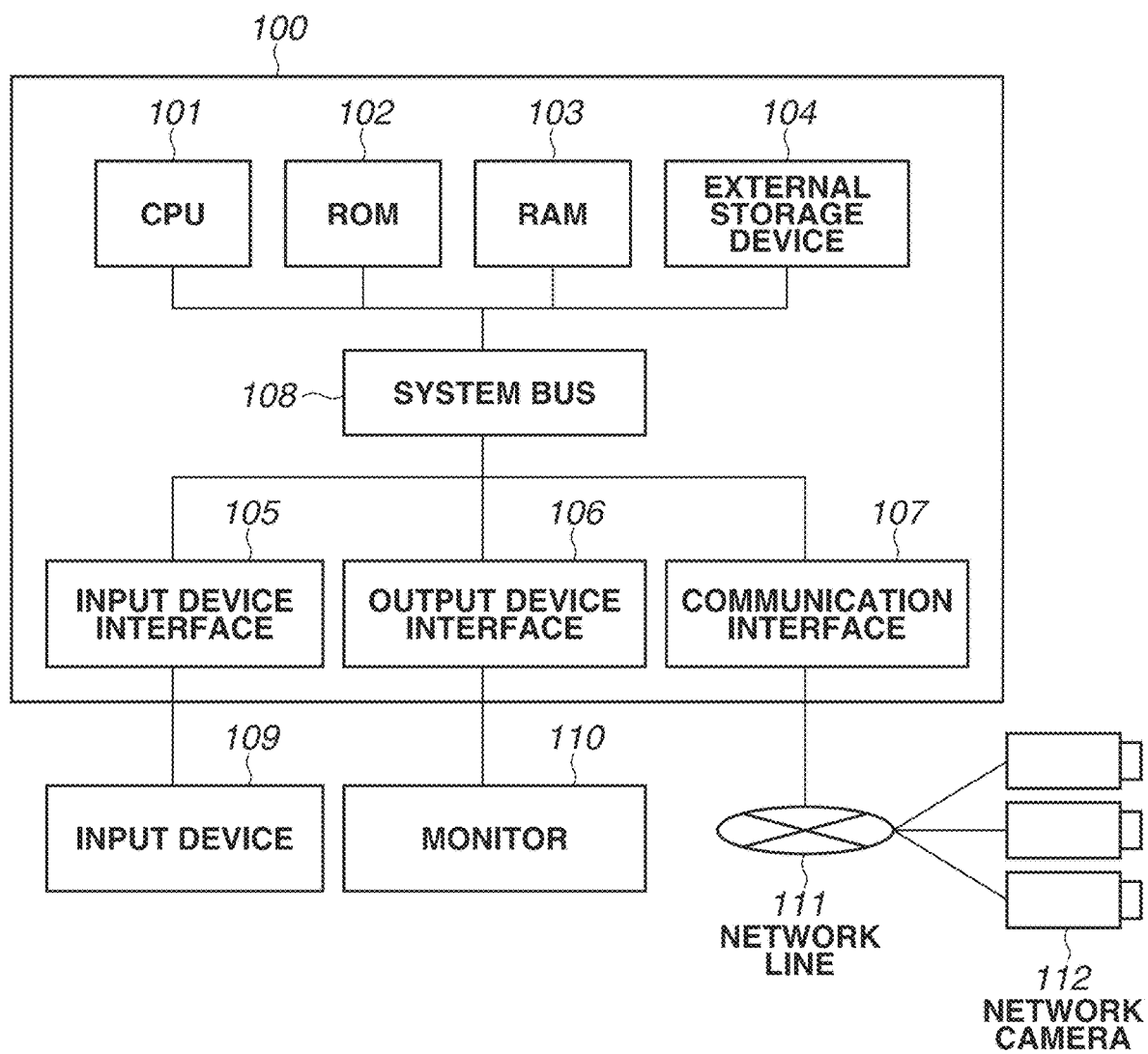
FIG. 1 is a block diagram illustrating a hardware configuration example of an information processing apparatus according to an embodiment of the present disclosure.

FIG. 1 is a block diagram illustrating a hardware configuration example of an information processing apparatus 100, which includes a server apparatus or a client apparatus, according to the present embodiment. The server apparatus or the client apparatus can be implemented by a single information processing apparatus or can be implemented by distributing the functions of the server apparatus or the client apparatus to a plurality of apparatuses as needed. When the server apparatus or the client apparatus includes a plurality of apparatuses, the apparatuses are connected via a local area network (LAN) or the like so that the apparatuses can communicate with each other. The information processing apparatus can be implemented by an apparatus, such as a personal computer (PC) or a work station (WS).

Referring to FIG. 1, a central processing unit (CPU) 101 controls the entire information processing apparatus 100. A read only memory (ROM) 102 is a memory that stores programs and parameters that need not be changed. A random access memory (RAM) 103 is a memory that temporarily stores programs and data supplied from an external device or the like. An external storage device 104 is a storage device, such as an hard disk or a memory card, which is fixed and installed in the information processing apparatus 100. The external storage device 104 can be an optical disk, such as a flexible disk (FD) or a compact disc (CD), a magnetic or optical card, an integrated circuit (IC) card, a memory card, or the like. Each operation described below is executed in such a manner that the CPU 101 executes the programs stored in the ROM 102 or the external storage device 104.

An input device interface 105 is an interface for connecting an input device 109, such as a pointing device or a keyboard, to receive a user's operation and input data. An output device interface 106 is an interface for connecting a monitor 110 for displaying data held by the information processing apparatus 100 or supplied data. A communication interface 107 is a communication interface for connecting to a network line 111, such as the Internet. Each network camera 112 is a video image pickup device, such as a surveillance camera, and is connected to the information processing apparatus 100 via the network line 111. A system bus 108 is a transmission path that connects the units described above so that the units can communicate with each other.

Figure 2:
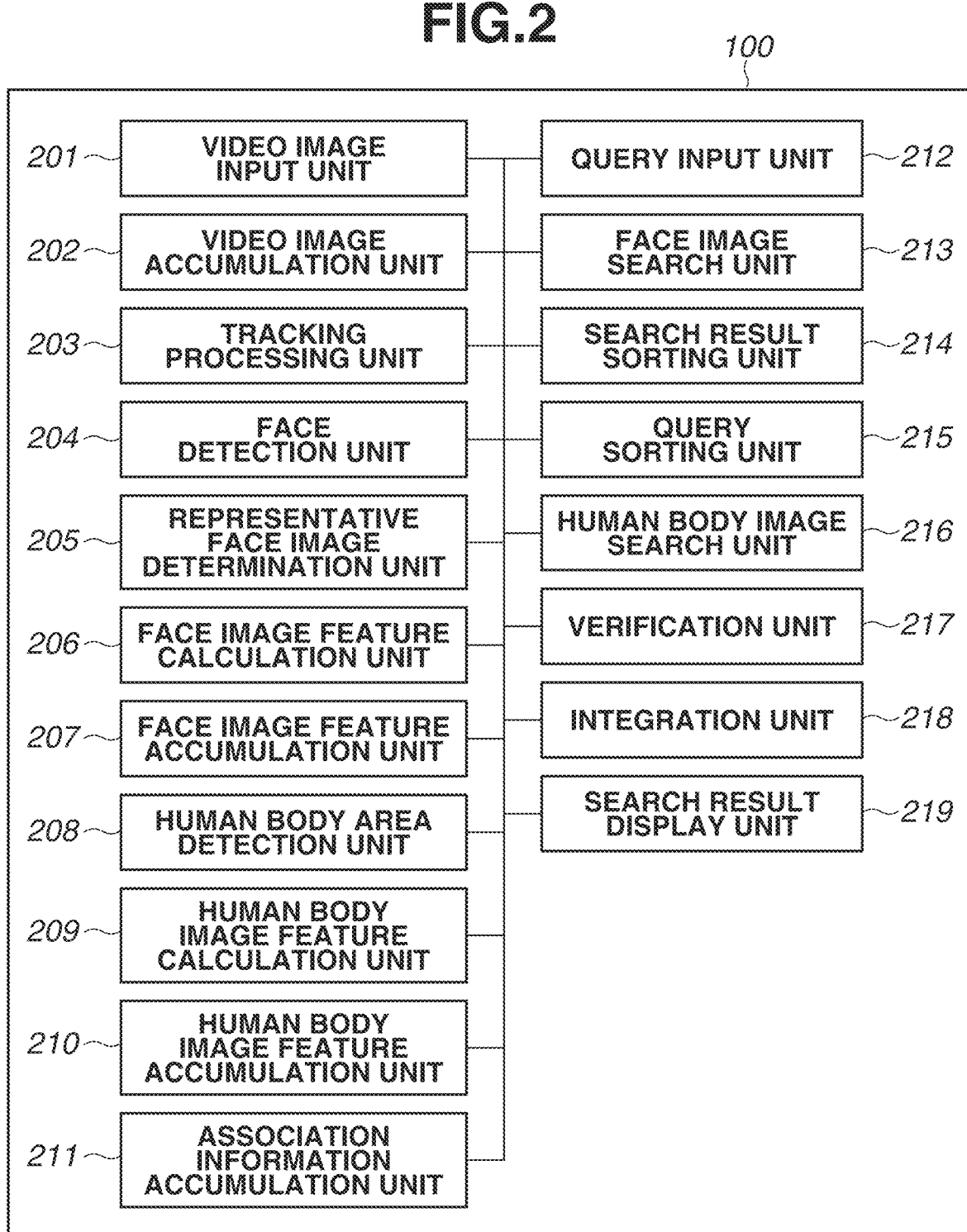
FIG. 2 is a block diagram illustrating a functional configuration example of an information processing apparatus according to a first embodiment.

FIG. 2 is a block diagram illustrating a functional configuration example of the information processing apparatus 100 according to the present embodiment.

A video image input unit 201 receives video image data (continuous image) from the network cameras 112 via the communication interface 107.

A video image accumulation unit 202 stores the video image data input to the video image input unit 201 in the external storage device 104. In this case, information including video image acquisition conditions, such as an image capturing time, which is a video image acquisition time, and an image capturing camera, which is a video image acquisition location, is stored as metadata for video images in association with the video image data.

A tracking processing unit 203 tracks a human figure in a video image input from the video image input unit 201. Human figure tracking processing can be performed using, for example, a publicly known technique discussed in Japanese Patent Application Laid-Open No. 2002-373332. In the method discussed in Japanese Patent Application Laid-Open No. 2002-373332, an object is detected based on a motion vector and a search position in the subsequent frame is estimated to track a human figure by template matching. In the tracking processing unit 203, the same tracking track ID is issued to tracking tracks for tracking the same human figure and different tracking track IDs are issued to tracking tracks for tracking different human figures, whereby the uniqueness is secured and the same human figure can be identified based on the tracking track ID. In a case where the tracking of the human figure is interrupted, another tracking track ID is issued.

A face detection unit 204 detects a face from each frame image of the human figure tracked by the tracking processing unit 203. The face detection unit 204 performs the face detection based on video images including face images input by the video image input unit 201 and a query input unit 212 described below. As a method for detecting the face of a human figure from an image, for example, a publicly known technique discussed in Japanese Patent Application Laid-Open No. 2010-165156 can be used. Specifically, one-eye candidate areas are detected from an image to be processed, and the candidate areas are paired from among a plurality of one-eye candidate areas to determine a face area based on the positions of the paired eyes.

A representative face image determination unit 205 selects a representative face image from a frame image group of the tracked human figure. In the processing of selecting the representative face image, for example, an image including a larger face detected by the face detection unit 204 is selected. The reason why an image including a larger face is used is that more accurate image features can be obtained from a larger face image. In other words, in the case of calculating an image feature based on a face image, it is necessary to perform face size normalization processing for scaling the size of the face image to a certain size. In this process, when the face image is larger than the certain size, reduction processing is performed. In such a case information loss is relatively small. When the face image is smaller than the certain size, pixel interpolation processing such as super-resolution processing is required, which results in considerable degradation of information.

As representative face images, a plurality of images can be selected from the frame image group. For example, there is a method for selecting images indicating different face directions. If the direction of the face of a person varies, the image features obtained from the images vary. As a method for detecting the face direction of a human figure from an image, for example, a publicly known technique of Erik Muphy-Chutorian, "Head pose estimation for driver assistance systems: A robust algorithm and experimental evaluation," in Proc. IEEE Conf. Intelligent Transportation Systems, 2007, pp. 709-714. (hereinafter referred to Erik Muphy-Chutorian) can be used. In the technique discussed in Erik Muphy-Chutorian, a histogram of oriented gradient (HOG) is extracted as a feature amount to estimate the face direction by SVR. The histogram of oriented gradient is such a feature amount that luminance gradient information about an image is converted into a histogram for each local area of the image, and is also known as a feature amount robust against local noise or image contrast. A feature amount robust against a variation that is not associated with the face direction, such as noise or illumination variation, is selected to thereby achieve stable estimation of the face direction in the actual environment.

Further, an image with less blurring can be selected as a representative face image. Like in a camera for capturing still images, the shutter speed of a camera for capturing moving images may vary depending on the brightness at the location. Accordingly, blurring of a face image sometimes occurs due to a dark place or a motion speed of a subject. This is a direct cause of degradation of an image feature amount or attribute information. As for the estimation of blurring, frequency components of a face image area are obtained and the ratio between low-frequency components and high-frequency components is obtained. When the ratio of low-frequency components exceeds a predetermined value, it can be determined that blurring occurs. In addition, a representative face image can be selected in terms of a face with closed eyes, a face with an open mouth, or the like. If a face with closed eyes, a face with an open mouth, or the like is present, image features of facial feature points may be altered. For this reason, such images are not selected as the representative face image. The methods for selecting the representative face image as described above are illustrated by way of example and the present disclosure is not limited to these methods.

A face image feature calculation unit 206 calculates a face image feature. In the present embodiment, facial feature points, such as eyes and a mouth, in the face image of a human figure are obtained and the scale invariant feature transform (SIFT) feature of each facial feature point is used. This feature is merely an example and the present disclosure is not limited to this example. The entire face may be divided into blocks and a local binary pattern (LBP) feature can be calculated for each block and used, or deep learning can be carried out to calculate the feature.

A face image feature accumulation unit 207 stores, in the external storage device 104, the face image feature calculated from the video image input to the video image input unit 201 through the tracking processing unit 203, the face detection unit 204, the representative face image determination unit 205, and the face image feature calculation unit 206. In addition, as metadata for the face image feature, information such as a human figure ID, a tracking track ID used when a human figure is tracked, an image capturing time, and an image capturing camera is stored in association with the face image feature.

A human body area detection unit 208 detects a human body area from each frame image of the human figure tracked by the tracking processing unit 203. As a method for detecting a human body from an image, for example, a publicly known technique discussed in the specification of United States Patent Publication Application No. 2007/0237387 can be used. In this method, a detection window having a predetermined size is caused to perform scanning on an input video image, and discriminating whether a pattern image obtained by cutting out an image in the detection window represents a human body. A discriminator is configured by effectively combining a large number of weak discriminators by AdaBoost to refine the discrimination accuracy. The discriminators are connected in series to form a cascade detector. Each weak discriminator discriminates a histograms of oriented gradients (HOG) feature amount as an input. The cascade detector first uses a simple discriminator disposed at a preceding stage to eliminate pattern candidates, which are obviously different from a subject, on the spot. For only the other candidates, a complicated discriminator that is disposed at a subsequent stage and has a high discrimination capability is used to discriminate whether the image represents a human body.

A human body image feature calculation unit 209 calculates a human body image feature. In the present embodiment, a human body area is divided into blocks and a local binary pattern (LBP) feature is calculated for each block. This feature is merely an example and the present disclosure is not limited to this example. A human body can be divided into areas, such as a head, an upper limb, and a lower limb, and the LBP feature can be calculated for each area. Alternatively, deep learning can be carried out to calculate the feature.

A human body image feature accumulation unit 210 stores, in the external storage device 104, the human body image feature calculated from the video image input by the video image input unit 201 via the tracking processing unit 203, the human body area detection unit 208, and the human body image feature calculation unit 209. In addition, as metadata for the human body image feature, information such as a human figure ID, a tracking track ID used when a human figure is tracked, an image capturing time, and an image capturing camera is stored in association with the human body image feature.

When the face image feature and the human body image feature can be calculated from the same human figure, an association information accumulation unit 211 stores association information about these features in the external storage device 104. In the present embodiment, assuming that human figures detected in a plurality of frame images obtained when a human figure is tracked by the tracking processing unit 203 are the same human figure, the association information about a plurality of face images and human body images obtained from the plurality of frame images is stored. Accordingly, the face images and the human body images are associated in a one-to-one correspondence, multiple-to-one correspondence, one-to-multiple correspondence, or multiple-to-multiple correspondence.

The query input unit 212 designates (inputs) a face image of a person used for search. Specifically, the human face image stored in the external storage device 104 is displayed on the monitor 110 and designated by a user's operation through the input device 109. The method for designating a human face image used for search according to the present disclosure is not limited to these examples. In this case, one or more human face images can be used for search.

A face image search unit 213 designates the face image feature that is calculated from a query image through the face detection unit 204 and the face image feature calculation unit 206 as a query, and searches for a face image by using the face image feature stored in the external storage device 104 by the face image feature accumulation unit 207. Face images with a similarity to a face image feature being equal to or higher than a predetermined threshold TH1 are identified as the search result. In the case of calculating the similarity, the sum total of distances of SIFT features at each facial feature point is obtained and the reciprocal number of the sum total of the distances is normalized to obtain the similarity.

A search result sorting unit 214 identifies face images with a similarity to a face image feature being equal to or higher than a predetermined threshold TH2 from the search result of the face image search unit 213. If face images representing different human figures are mixed, a person different from the person to be searched may be searched in the subsequent processing. Accordingly, a value equal to or greater than the threshold TH1 is preliminarily set as the threshold TH2 so that only the face image representing the same human figure as that represented by the face image of the query image can be sorted out. Further, as needed, an upper limit is set for the number of face images to be sorted.

A query sorting unit 215 determines, based on the association information accumulated in the external storage device 104 by the association information accumulation unit 211, whether there is a human body image feature associated with the face image feature for the face image sorted out by the search result sorting unit 214. In a case where the associated human body image feature is stored in the external storage device 104, the human body image feature is acquired from the external storage device 104. A plurality of face images may be sorted out by the search result sorting unit 214 and a plurality of human body image features may be associated with a single face image feature. As a result, a large number of human body image features may be acquired. Accordingly, in such a case, one or more representative human body image features are sorted out from the human body image features. In the case of sorting out the human body image features, clustering is performed on the human figure image features and only the human figure image feature close to the center of gravity of each cluster is sorted out from each cluster.

A human body image search unit 216 designates the human body image feature sorted out by the query sorting unit 215 as a query, and searches for a human body image by using the human body image features stored in the external storage device 104 by the human body image feature accumulation unit 210. A human body image with a similarity to a human body image feature being higher than a predetermined threshold is identified as the search result. In the case of calculating the similarity, the reciprocal number of distances of LBP features is normalized to obtain the similarity.

A verification unit 217 determines, based on the association information accumulated in the external storage device 104 by the association information accumulation unit 211, whether there are face image features associated with the image obtained as the research result of the human body image search unit 216. If the associated face image features are stored in the external storage device 104, the face image features are acquired from the external storage device 104. Further, the acquired face image features are compared with the face image feature calculated from the face image of the query image, to obtain the similarity. When the similarity is lower than a predetermined threshold TH3, a human body image including the human body image feature associated with the face image feature is deleted from the search result. The discrimination capability of the comparison of human body image features is lower than the discrimination capability of the comparison of face image features. Accordingly, the search result of the human body image is verified by comparing face image features. As the threshold TH3 used herein, a value that is equal to or less than the threshold TH2 used by the search result sorting unit 214 and is greater than a value at which a detection omission of the same human figure is reduced is set. While in the present embodiment, the human body image is deleted from the search result so that the verification result is reflected in the search result, correction processing can be performed to lower the similarity of the search result of the human body image. The similarity for the human body image search can be corrected by, for example, multiplying the similarity for the verification using face image features and the similarity for the human body image search.

An integration unit 218 integrates the search result of the face image searched by the face image search unit 213 with the search result of the human body image corrected by the verification unit 217, thereby updating the search result of the face image.

A scatter diagram between the similarity of face image features and the similarity of human body image features is created using the similarities obtained as the result of each of the face image search and the human body image search, and an approximate straight line between these values is generated. The generated approximate straight line is used as a transformation for the result in which the search result of the face image is not present, and the similarity of face image features is calculated in a pseudo manner from the similarity of human body image features. These similarities are sorted and the search results are integrated. The present embodiment is illustrated by way of example and the approximate straight line can be obtained using only some of the search results of the both searches. For images that are not obtained as the search results of the both searches but include both feature amounts, the similarity can be calculated by comparing the feature that is not searched with the corresponding query feature. The approximate straight line can be obtained using the similarity thus obtained. As an approximation, a high-order approximate curve, an exponential function approximate curve, or the like can be used instead of the approximate straight line. In the present embodiment, the similarity of face image features is calculated in a pseudo manner for the result in which the similarity of the face image feature is not present. This is because the discriminability of the comparison of face image features is higher than the discriminability of the comparison of human body image features. Therefore, the similarity of face image features is preferentially used. However, the present disclosure is not limited to this method. The both similarities can be obtained and an integrated similarity can be calculated by, for example, a weighted average of the similarities.

Figure 15A:
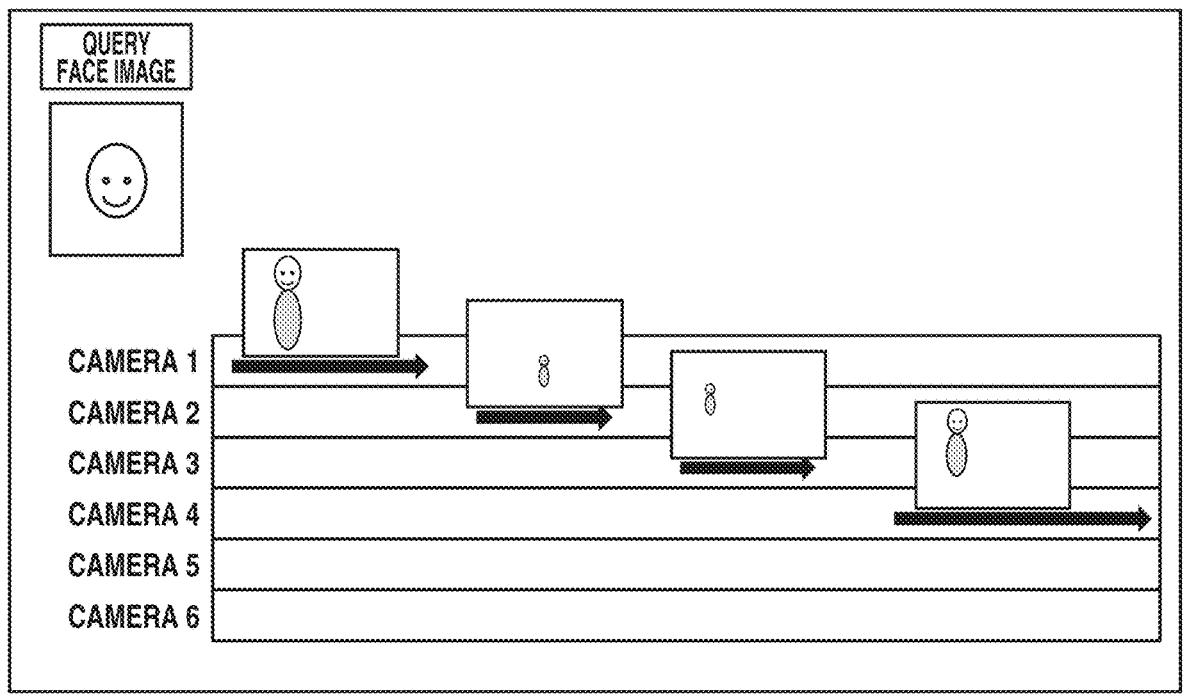
FIGS. 15A to 15E are diagrams each illustrating a display example of a search result.
Figure 15B:
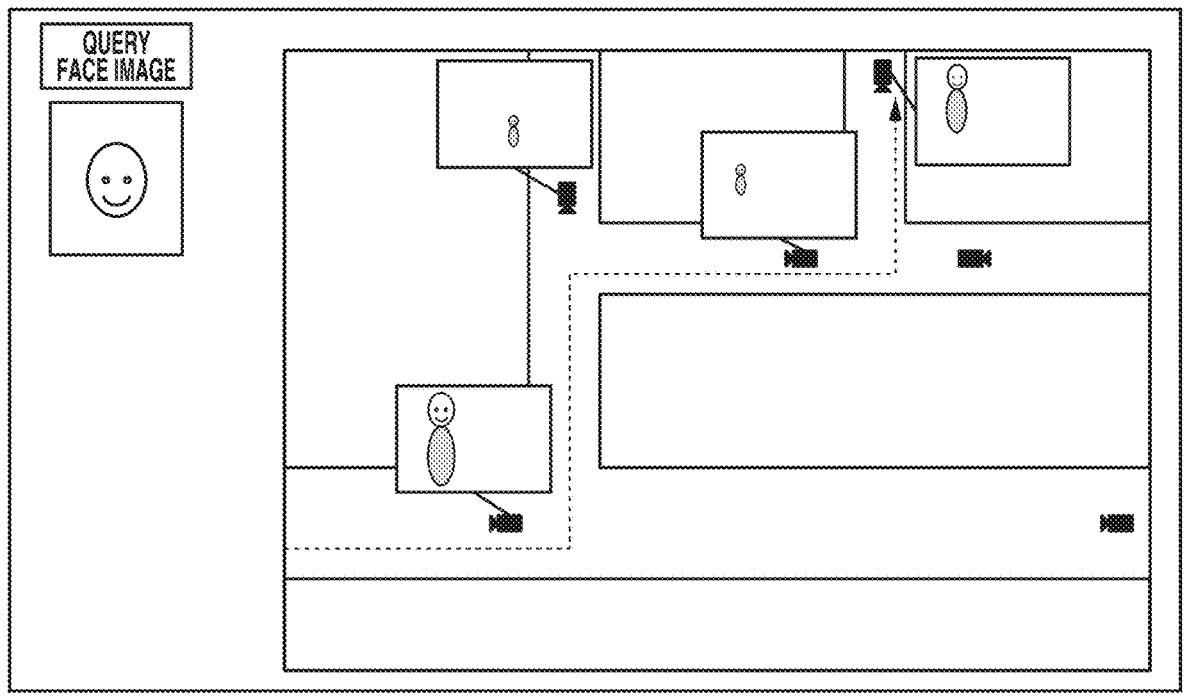
Figure 15C:
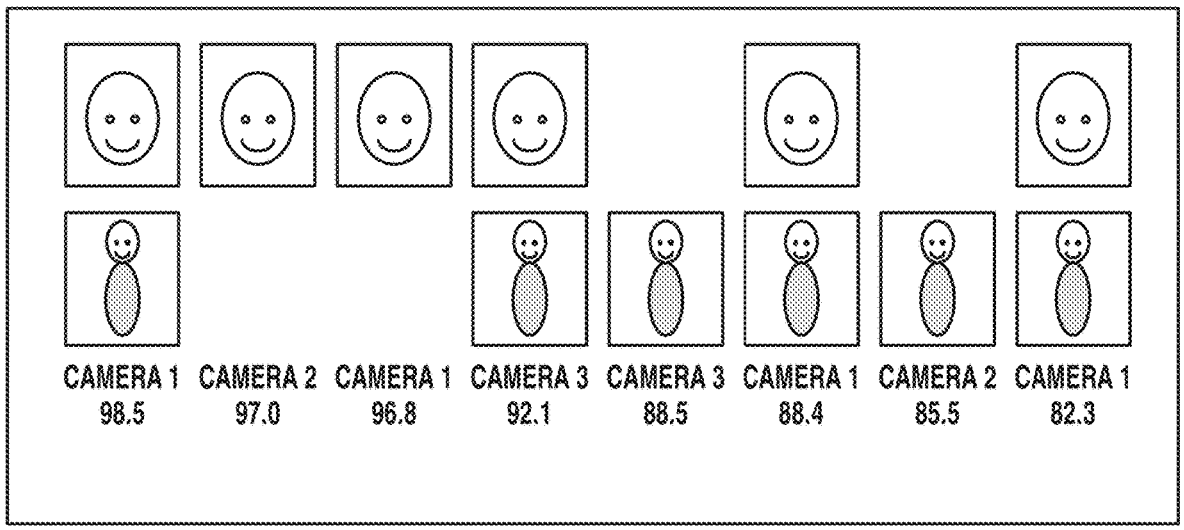
Figure 15D:
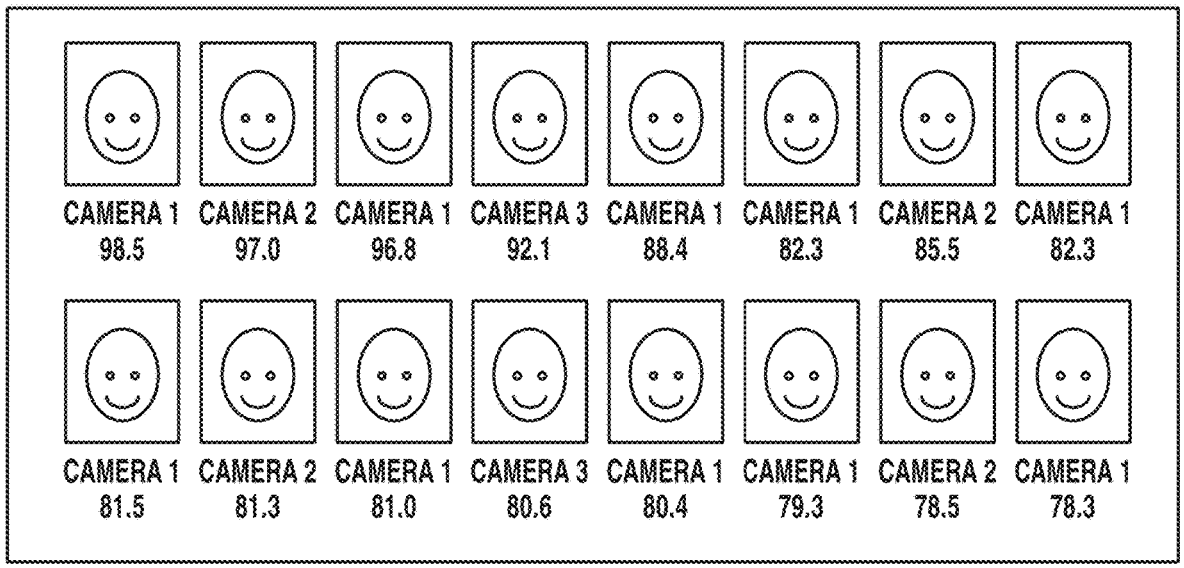
Figure 15E:
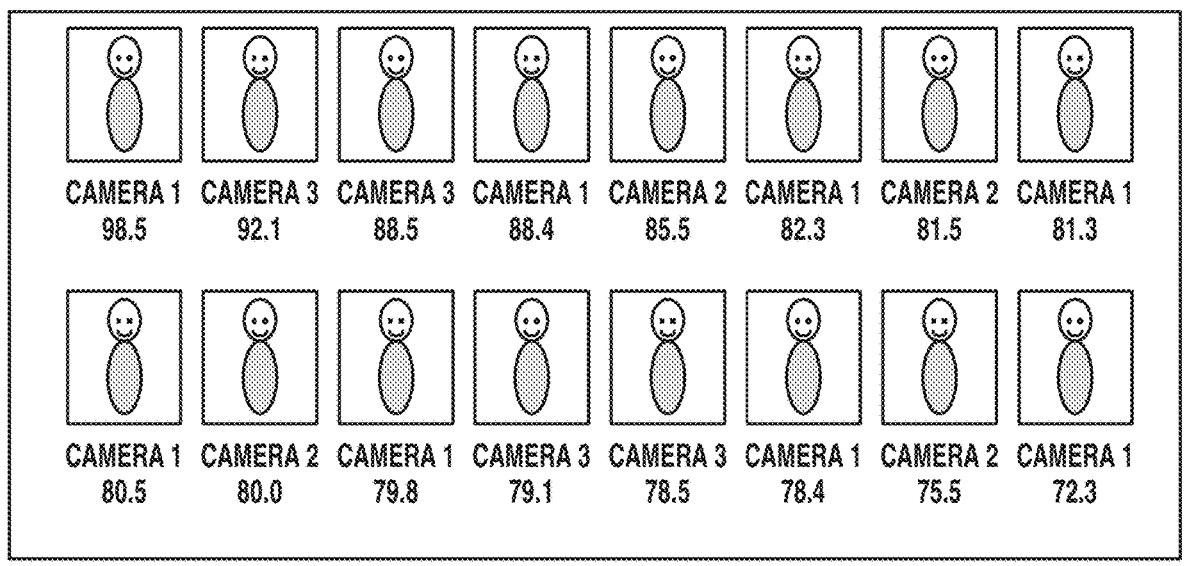

A search result display unit 219 displays the search results integrated by the integration unit 218 on the monitor 110. For example, as illustrated in FIG. 15A, the search results are classified of each camera and displayed on the monitor 110 in the order of image capturing times. Alternatively, as illustrated in FIG. 15B, installation positions of the cameras may be displayed on a map and movement histories may be displayed on the monitor 110 based on image capturing times. Further, the search results may be displayed as a score. For example, as illustrated in FIG. 15C, the results of the face image search and the human body image search are integrated and displayed in a distinguishable manner within the same screen. These results can be displayed on separate screens. Referring to FIG. 15D, only the result of the face image search is displayed. Referring to FIG. 15E, only the result of the human body image search is displayed. These result displays can be switched. The method for displaying the comparison result according to the present disclosure is not limited to these examples. Further, different display formats can be set by, for example, changing colors of rectangular frames, so that the result of a search using a first feature amount (face image feature) can be distinguished from the result of a search using a second feature amount (human body image feature).

Next, processing for accumulating video image data input from the video image input unit 201 in such a manner that the video data can be searched will be described in detail with reference to FIG. 3.

Figure 3:
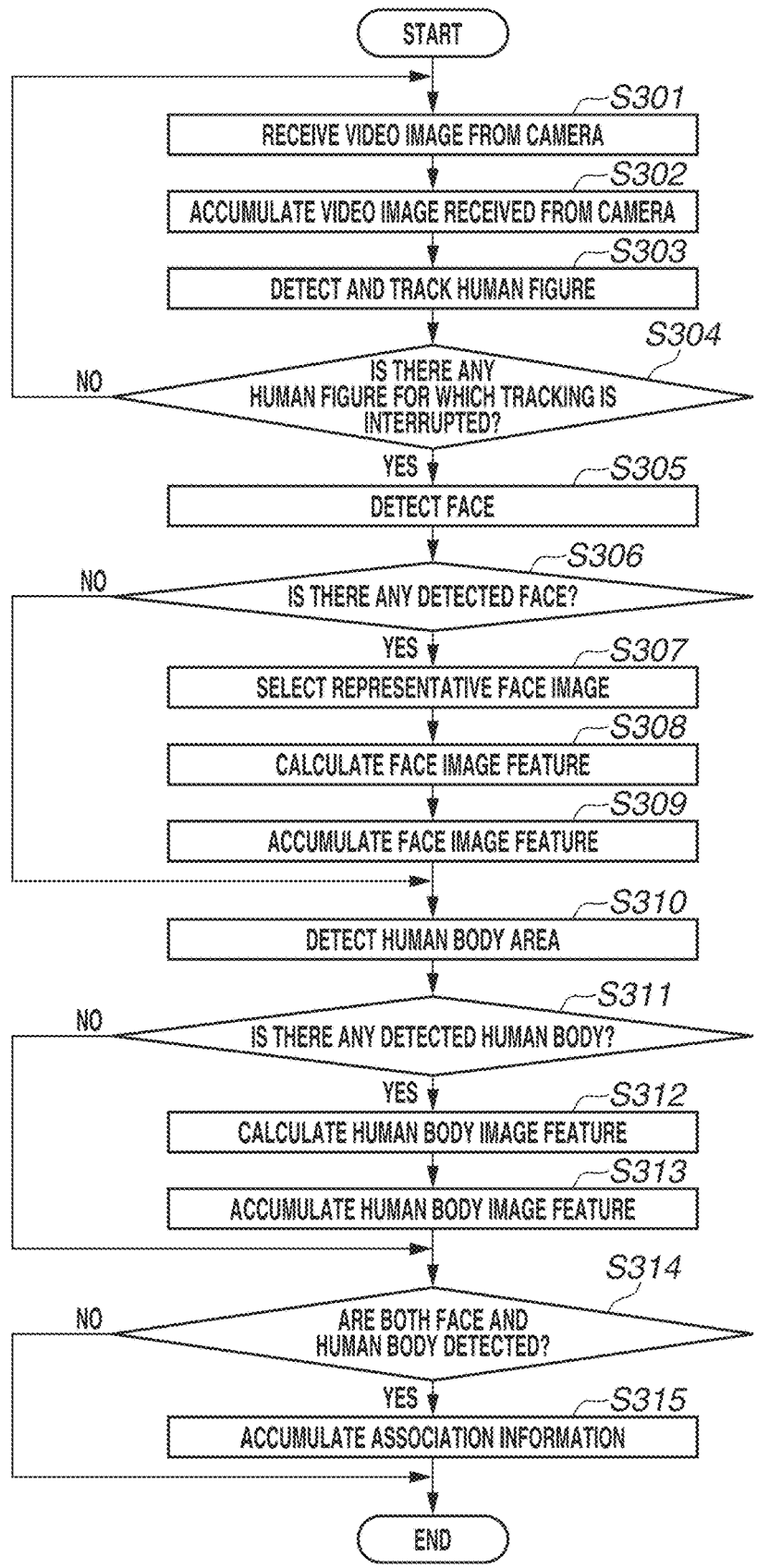
FIG. 3 is a flowchart illustrating an example of a processing procedure of accumulating face image features and human body image features according to the first embodiment.

FIG. 3 is a flowchart illustrating an example of a processing procedure of accumulating face image features and human body image features according to the present embodiment. This processing corresponds to the processing performed by the units from the video image input unit 201 to the association information accumulation unit 211 described above, and thus the detailed description of the processing is omitted.

In step S301, the video image input unit 201 receives video image data from the network cameras 112 through the communication interface 107.

In step S302, the video image accumulation unit 202 stores the video image data received in step S301 in the external storage device 104. In addition, information such as an image capturing time and a camera which has captured the video image is stored as metadata for the video image.

Steps S303 and S304 are processing performed by the tracking processing unit 203. First, in step S303, the tracking processing unit 203 detects a human figure from each frame image and tracks the detected human figure. In this case, human figure IDs are allocated to the respective frame images of the detected human figure, and the human figure IDs are temporarily stored together with the coordinates of the human figure in each frame image. The same tracking track ID is allocated to the human figure being tracked, and the tracking track ID is temporarily stored together with the ID of the frame image being tracked.

In step S304, the tracking processing unit 203 determines whether there is a human figure for which tracking is interrupted. As a result of the determination, in a case where there is a human figure for which tracking is interrupted (YES in step S304), the tracking image group of the human figure is determined, and thus the processing proceeds to the subsequent step S305. In a case where there is no human figure for which tracking is interrupted (NO in step S304), the processing returns to step S301 to continue tracking.

In step S305, the face detection unit 204 detects a face from each frame image including the human figure tracked by the tracking processing unit 203.

In step S306, the face detection unit 204 determines whether there is any face detected in the processing of step S305. As a result of the determination, in a case where there is a detected face (YES in step S306), the processing proceeds to step S307, and in a case where no face is detected (NO in step S306), the processing proceeds to step S310.

In step S307, the representative face image determination unit 205 selects one or more face images as a representative image of the detected face from the frame image group of the tracked human figure.

In step S308, the face image feature calculation unit 206 calculates a face image feature from the one or more representative face images selected in step S307.

In step S309, the face image feature accumulation unit 207 stores the face image feature calculated in step S308 in the external storage device 104. In addition, as metadata for the face image feature, information such as a human figure ID, a tracking track ID used when a human figure is tracked, an image capturing time, and an image capturing camera is stored in association with the face image feature.

In step S310, the human body area detection unit 208 detects a human body area from each frame image of the human figure tracked by the tracking processing unit 203.

In step S311, the human body area detection unit 208 determines whether there is any human body detected in the processing of step S310. As a result of the determination, in a case where there is a detected human body (YES in step S311), the processing proceeds to step S312, and in a case where no human body is detected (NO in step S311), the processing proceeds to step S314.

In step S312, the human body image feature calculation unit 209 calculates a human body image feature from the frame image in which the human body is detected.

In step S313, the human body image feature accumulation unit 210 stores the human body image feature calculated in step S312 in the external storage device 104. In addition, as metadata for the human body image feature, information such as a human figure ID, a tracking track ID used when a human figure is tracked, an image capturing time, and an image capturing camera is stored in association with the human body image feature.

In step S314, the association information accumulation unit 211 determines whether there is a human figure that matches both the face detected in step S305 and the human body detected in step S310. For example, it is determined whether there is a human figure that matches the tracking track ID by referring to the metadata for the face image feature and the human body image feature. As a result of the determination, in a case where there is a combination of a face and a human body for the same human figure (YES in step S314), the processing proceeds to step S315. In a case where there is no combination of a face and a human body for the same human figure, the processing is terminated. In step S315, the association information accumulation unit 211 stores, in the external storage device 104, the association information that associates the face image feature and the human body image feature that are calculated from the same human figure, and then terminates the processing.

By the processing described above, the face image features of the face image of the human figure included in the video images input from the network cameras 112 are accumulated in the external storage device 104 by the face image feature accumulation unit 207 and thus the search is ready. The human body image features of the human body image of the human figure are also accumulated in the external storage device 104 by the human body image feature accumulation unit 210, and thus the search is ready.

Next, the processing of searching for a face image and a human body image of a human figure from a query image input from the query input unit 212 will be described in detail with reference to FIG. 4.

Figure 4:
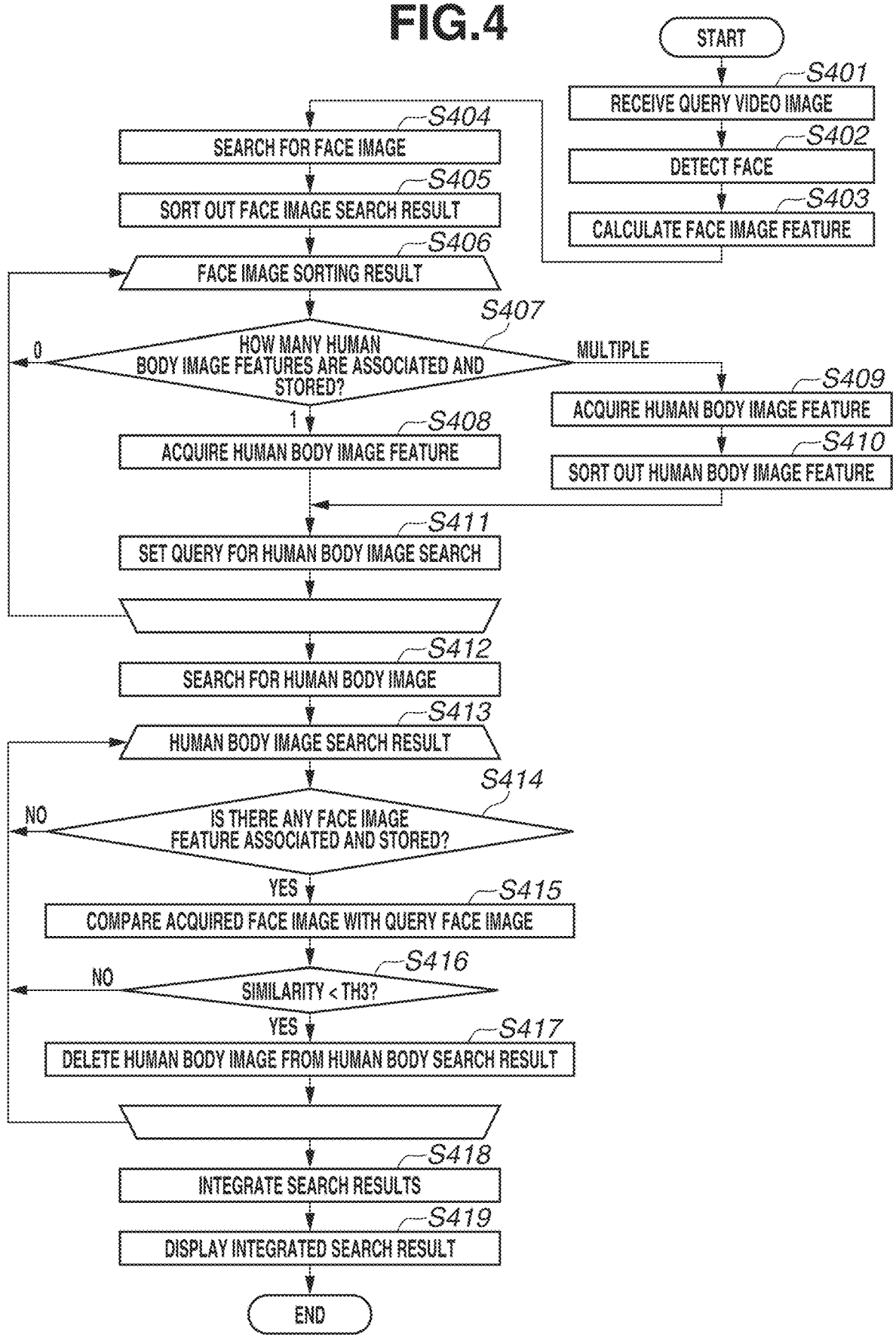
FIG. 4 is a flowchart illustrating an example of a processing procedure of searching for a face image and a human body image of a human figure according to the first embodiment.

FIG. 4 is a flowchart illustrating an example of the processing procedure of searching for a face image and a human body image of a human figure according to the present embodiment. This processing corresponds to the processing performed by the face detection unit 204, the face image feature calculation unit 206, and the query input unit 212 to the search result display unit 219 illustrated in FIG. 2 described above, and thus detailed description of the processing is omitted.

Figure 5:
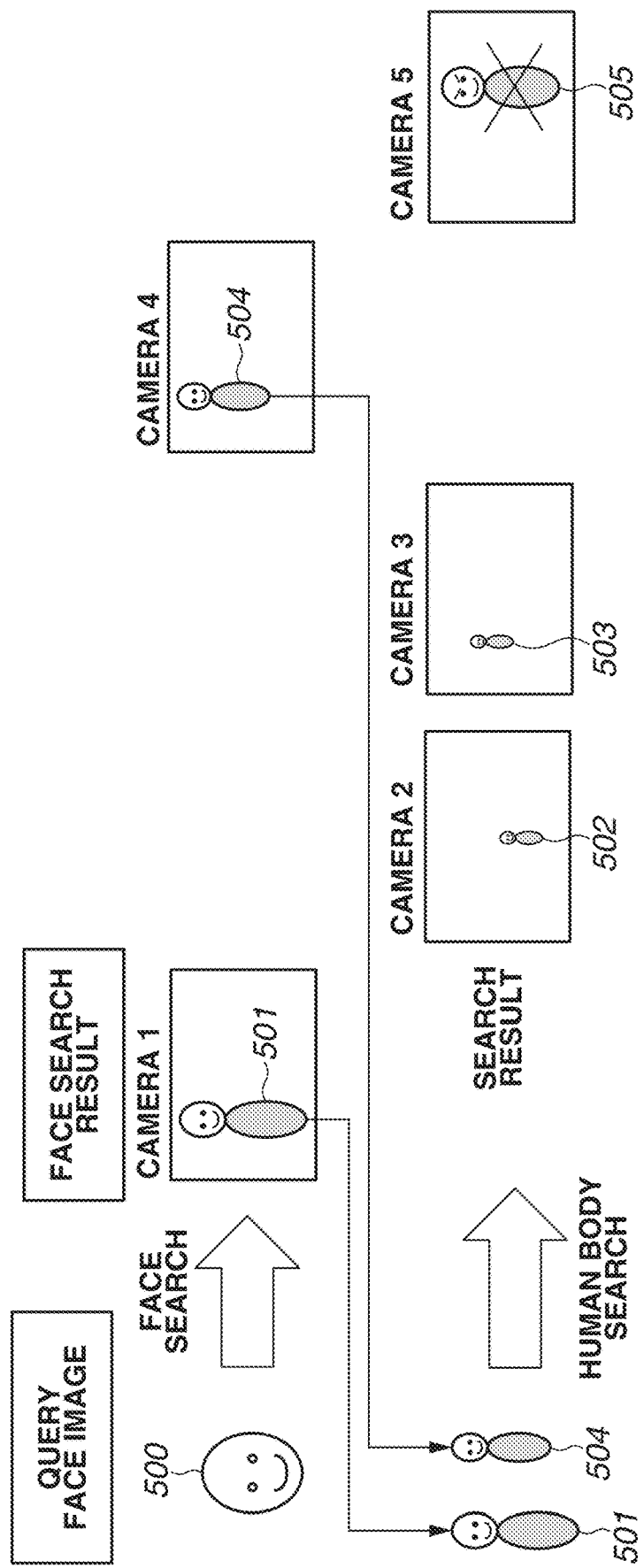
FIG. 5 is an explanatory diagram illustrating an outline of searching for a face image and a human body image of a human figure.

First, the concept of the processing flow will be described with reference to FIG. 5. In the example illustrated in FIG.

5, a human figure designated as a query is displayed on cameras 1 to 4 out of five cameras. First, the face image search is carried out based on a face image 500 given as a query. As a result, search results 501 and 504 are respectively obtained from the cameras 1 and 4 on which the face is clearly displayed. Next, the human body image search is carried out using the search results 501 and 504 as a query. As a result, search results 502, 503, and 505 are respectively obtained from the cameras 2, 3, and 5. In this case, the search result 505 of the camera 5 shows a clear image of the face. Accordingly, the query face image is compared with the face image of the search result 505. In this case, it is obvious that the similarity between the query face image and the search result 505 is low, and thus the search result 505 is deleted from the search result. Finally, the images of the search results 501 to 504 of the cameras 1 to 4 are obtained as correct search results.

In step S401, the query input unit 212 receives a face image of a person used for search.

In step S402, the face detection unit 204 detects a face from a video image including the face image received by the query input unit 212.

In step S403, the face image feature calculation unit 206 calculates a face image feature from the face image detected in step S402.

In step S404, the face image search unit 213 designates the face image feature calculated in step S403 as a query and searches for face images using the face image feature stored in the external storage device 104 by the face image feature accumulation unit 207. Then, face images with a similarity to a face image feature being equal to or higher than the predetermined threshold TH1 are identified as the search result.

In step S405, the search result sorting unit 214 identifies face images with a similarity to a face image feature being equal to or higher than the predetermined threshold TH2 are identified from the search result identified in step S404.

Steps S406 to step S411 are processing performed by the query sorting unit 215, and the processing is executed in a loop by a number of times equal to the number of face images sorted out in step S405.

In step S407, the query sorting unit 215 determines, based on the association information accumulated in the external storage device 104, whether the human body image feature associated with the face image feature for the face image to be processed is stored in the external storage device 104. As a result of the determination, in a case where the associated human body image feature is not stored in the external storage device 104 ("0" in step S407), the processing returns to step S406 to perform processing on the subsequent face image. In a case where one associated human body image feature is stored in the external storage device 104 ("1" in step S407), the processing proceeds to step S408. In a case where a plurality of associated human body image features is stored in the external storage device 104 ("MULTIPLE" in step S407), the processing proceeds to step S409.

In step S408, the query sorting unit 215 acquires the human body image feature from the external storage device 104.

On the other hand, in step S409, the query sorting unit 215 acquires the plurality of human body image features from the external storage device 104.

In step S410, the query sorting unit 215 performs clustering of the plurality of human figure image features, and sorts out only the human figure image feature close to the center of gravity of each cluster. This processing can be performed on all cameras, or can be performed on each group of cameras after grouping the cameras. The human figure image features can be sorted out for the entire time period, or can be sorted out for each divided time period. The human figure image features are sorted out after grouping the cameras or dividing the time periods, whereby a search can be effectively performed with a focus on a search object during the human body image search in step S412 described below.

In step S411, the query sorting unit 215 sets, as a query for human body image search, the human figure image feature acquired in step S408, or the human figure image feature sorted out in step S410.

In step S412, the human body image search unit 216 designates the human body image feature set in step S411 as a query and searches for a human body image by using the human body image feature stored in the external storage device 104 by the human body image feature accumulation unit 210. A human body image with a similarity to a human body image feature being equal to or higher than a predetermined threshold is identified as the search result.

In this case, the human body image search can be performed by limiting the installation location or image capturing time of each camera. Specifically, the search can be performed by adding such a limitation that if it can be confirmed that a human figure to be searched is displayed on a certain camera, the human figure will not be displayed in close time periods on cameras installed at locations far from the camera. In this case, information about the location of each camera and time can be obtained from the search result of the face image sorted out in step S405, and thus a limitation on a search range can be added. Further, in step S410, when the human figure image features are sorted out by grouping the cameras, are sorted out for each camera, or are sorted out for each divided time period, a search can be made using, as a query, images obtained in close time periods at locations close to the cameras used for search, whereby a more effective search can be performed.

Steps S413 to S417 are processing performed by the verification unit 217, and the processing is executed in a loop by a number of times equal to the number of human body images searched in step S412.

In step S414, the verification unit 217 determines, based on the association information accumulated in the external storage device 104, whether the face image feature associated with the human body image feature for the human body image to be processed is stored in the external storage device 104. As a result of the determination, in a case where the associated face image feature is not stored in the external storage device 104 (NO in step S414), the processing returns to step S413 to perform processing on the subsequent human body image. In a case where the associated face image feature is stored in the external storage device 104 (YES in step S414), the processing proceeds to step S415.

In step S415, the verification unit 217 acquires the face image feature from the external storage device 104 and compares the acquired face image feature with the face image feature of the query calculated in step S403, to obtain the similarity. In step S416, the verification unit 217 determines whether the similarity calculated in step S415 is lower than the predetermined threshold TH3. As a result of the determination, in a case where the similarity is equal to or higher than the predetermined threshold TH3 (NO in step S416), the processing returns to step S413 to perform processing on the subsequent human body image. In a case where the similarity is lower than the predetermined threshold TH3 (YES in step S416), the processing proceeds to step S417.

In step S417, the verification unit 217 deletes the human body image to be processed from the search result of human body images.

In step S418, the integration unit 218 integrates the search result of the face image obtained in step S404 with the search result of the human body image corrected in steps S413 to S417.

In step S419, the search result display unit 219 displays the search results integrated in step S418 on the monitor 110. When a plurality of results is obtained from the same camera, only the result showing a highest face image similarity can be displayed instead of displaying all the obtained results.

As described above, according to the present embodiment, face image features and human body image features are extracted from a series of images of the same human figure obtained by tracking the human figure in video images captured by surveillance cameras, and these features are associated and stored. The face image search is performed based on a face image given as a query. After that, the human body image search is performed using the human body image features that are registered in association with the face image features with a similarity to the query face image being equal to or higher than the predetermined threshold. This configuration allows a search for a person to be searched not only from surveillance video images including the face of the person, but also from surveillance video images in which the face of the person is not clearly displayed. Further, since the search result of the human body image is verified using the face image feature with high discriminability, erroneous detection in the search can be reduced.

In the first embodiment, the human body image search is performed using the human body image features registered in association with the face image features with a similarity to the query face image being equal to or higher than the predetermined threshold. Further, the human body image search result is verified based on the predetermined threshold by using the face image features. In a second embodiment, one or more face images are selected by a user from the search result of face images, and the human body image search is performed using the human body image features registered in association with the face image features. The human body image search result is verified based on the similarity of the search result of face images selected by the user.

The hardware configuration of the information processing apparatus according to the second embodiment is similar to that illustrated in FIG. 1, and thus the description thereof is omitted. A functional configuration of the information processing apparatus according to the present embodiment will be described with reference to FIG. 6. Only differences between the present embodiment and the first embodiment will be described below.

Figure 6:
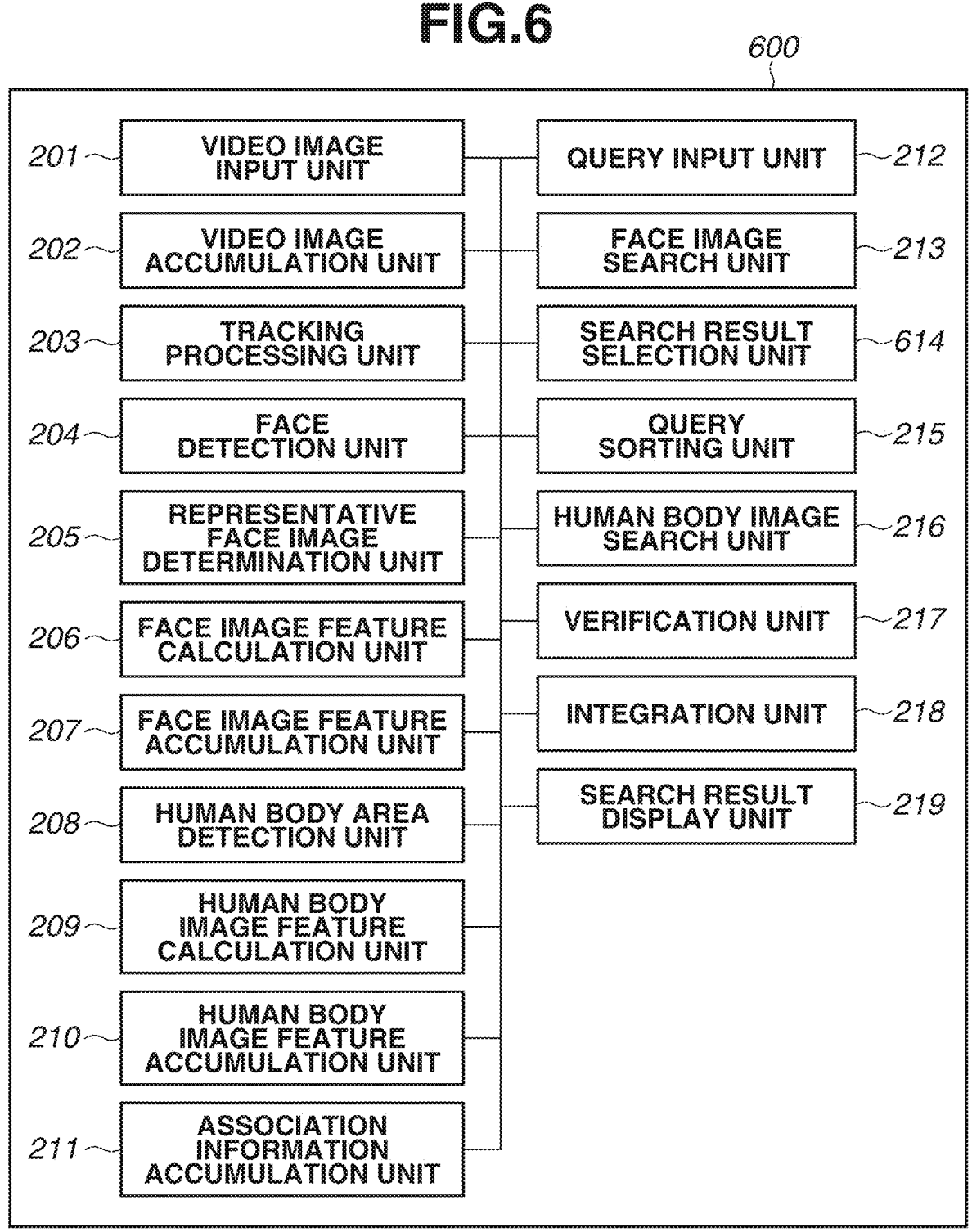
FIG. 6 is a block diagram illustrating a functional configuration example of an information processing apparatus according to a second embodiment.

FIG. 6 is a block diagram illustrating a functional configuration example of an information processing apparatus 600 according to the second embodiment. The video image input unit 201 to the face image search unit 213, the query sorting unit 215, the human body image search unit 216, and the integration unit 218 are similar to those illustrated in FIG. 2, and thus descriptions thereof are omitted.

The search result display unit 219 displays the search results integrated by the integration unit 218, and also displays the result of the search performed by the face image search unit 213.

A search result selection unit 614 is used for the user to select one or more face images from a face image group associated with the search result of face image features displayed on the search result display unit 219.

Like in the first embodiment, the verification unit 217 compares the predetermined threshold TH3 with the similarity obtained by comparing the face image feature of the query image with the face image feature registered in association with the human body image feature obtained as the human body image feature search result. As the threshold TH3 used herein, a preliminarily set value can be used like in the first embodiment, but instead the threshold TH3 can be dynamically determined based on the similarity between the face image feature of the face image selected by the search result selection unit 614 and the face image feature of the query face image. For example, in the present embodiment, a minimum similarity among similarities between the face image feature of the query face image and the face image features of a plurality of face images selected by the search result selection unit 614 is set as the threshold TH3. Alternatively, a value that is smaller than the minimum similarity by a certain amount or a certain ratio can be used as the threshold TH3.

Next, the processing procedure of the information processing apparatus 600 according to the present embodiment will be described in detail. The processing procedure of accumulating face image features and human body image features in the external storage device 104 is similar to that illustrated in FIG. 3. The processing procedure of searching for a face image and a human body image of a human figure will be described below with reference to FIG. 6. This processing corresponds to the processing performed by the face detection unit 204, the face image feature calculation unit 206, the query input unit 212 to the search result display unit 219, and the search result selection unit 614 illustrated in FIG. 6 described above, and the detailed description of the processing is omitted.

Figure 7:
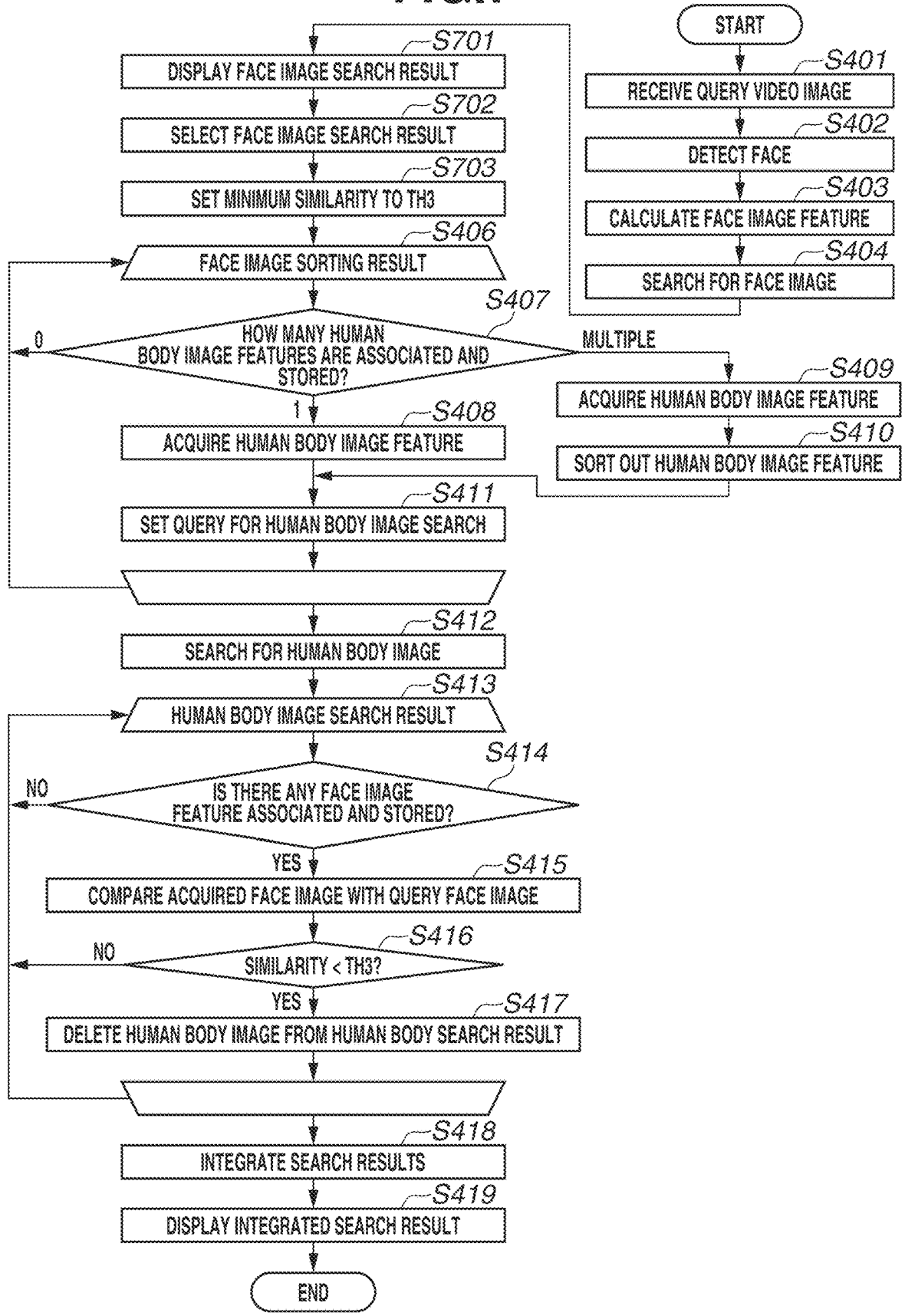
FIG. 7 is a flowchart illustrating an example of a processing procedure of searching for a face image and a human body image of a human figure according to the second embodiment.

FIG. 7 is a flowchart illustrating an example of the processing procedure of searching for a face image and a human body image of a human figure according to the present embodiment.

Steps S401 to S404 illustrated in FIG. 7 are respectively similar to steps S401 to S404 illustrated in FIG. 4.

In step S701, the search result display unit 219 displays the search result of the face image obtained in step S404 on the monitor 110.

In step S702, the search result selection unit 514 selects one or more face images from the face image search result displayed on the monitor 110. In this processing, the user selects a face image from the input device 109 and the search result selection unit 514 selects a face image based on a user's instruction through the input device interface 105.

In step S703, the verification unit 217 sets, as the threshold TH3, a minimum similarity among similarities between the face image feature of the query face image and the face image features of a plurality of face images selected by the search result selection unit 514.

Steps S406 to S419 are respectively similar to steps S406 to S419 illustrated in FIG. 4.

As described above, according to the present embodiment, the user selects one or more face images from the face image search result to perform the human body image search using the human body image features registered in association with the face image features. Further, the human body image search result is verified based on the similarity of the search result of the face image selected by the user. A correction for search refinement is performed in an interaction with the user, so that a search result with less erroneous detection can be obtained.

In the first and second embodiments, the face image search and the human body image search are performed when a face image is given as a query. In a third embodiment, the face image search and the human body image search are performed when a human body image is given as a query.

Figure 8:
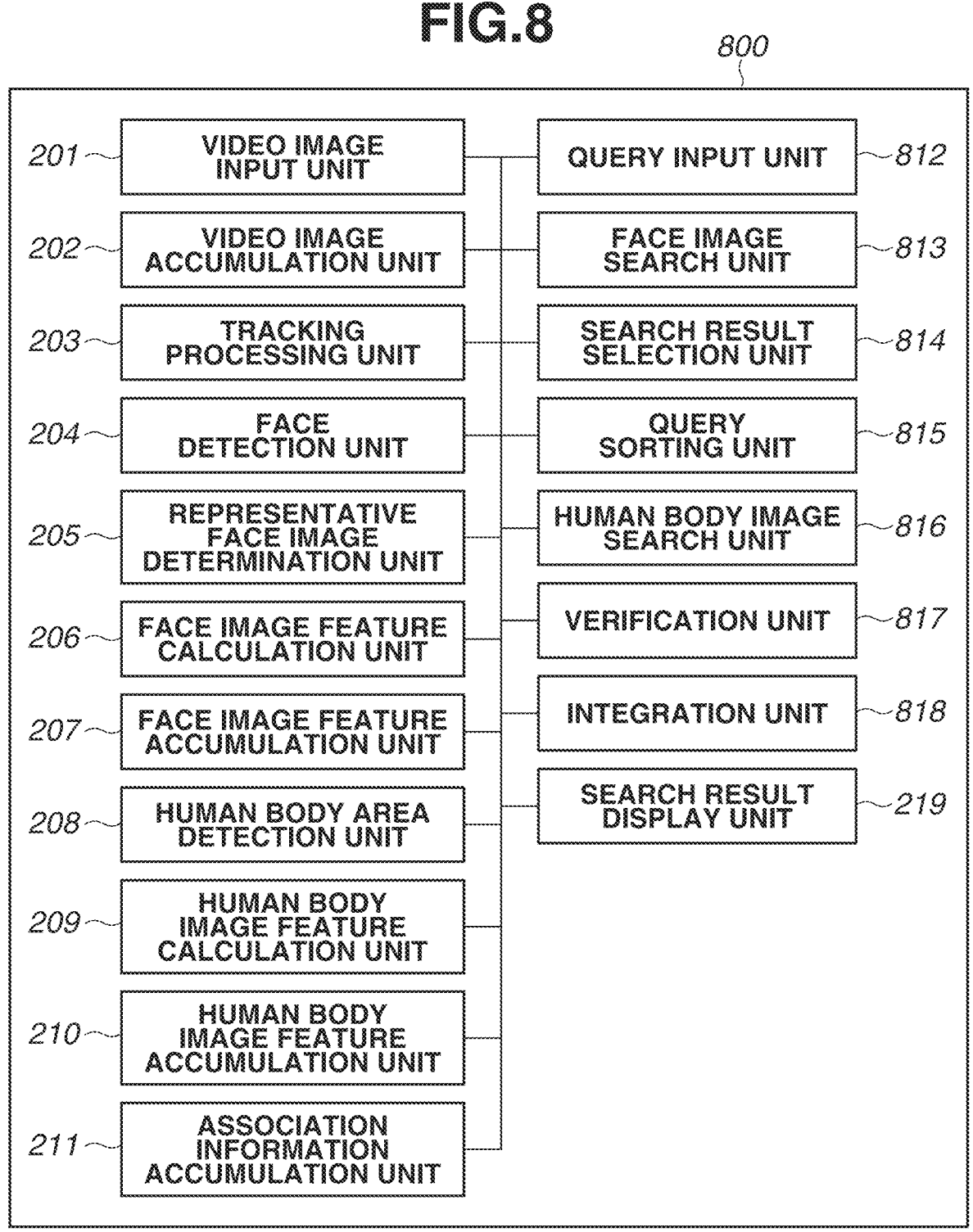
FIG. 8 is a block diagram illustrating a functional configuration example of an information processing apparatus according to a third embodiment.

The hardware configuration of the information processing apparatus according to the third embodiment is similar to that illustrated in FIG. 1, and thus the description thereof is omitted. A functional configuration of the information processing apparatus according to the present embodiment will be described below with reference to FIG. 8. Only differences between the present embodiment and the second embodiment will be described below.

A query input unit 812 designates (inputs) a human body image of a person used for search. Specifically, the human body image of the person stored in the external storage device 104 is displayed on the monitor 110 and designated by a user's operation through the input device 109. The method for designating a human body image of a person used for search according to the present disclosure is not limited to these examples. In this case, one or more human body images of a person can be used for search.

A human body image search unit 816 designates the human body image feature calculated from the query image through the human body area detection unit 208 and the human body image feature calculation unit 209 as a query and searches for a human body image by using the human body image feature stored in the external storage device 104 by the human body image feature accumulation unit 210. Further, a human body image with a similarity to a human body image feature being equal to or higher than the predetermined threshold TH1 is identified as the search result. In the case of calculating the similarity, the reciprocal number of distances of LBP features is normalized to obtain the similarity.

A search result selection unit 814 is used for the user to select one or more human body images from the human body image group associated with the human body image feature search result displayed on the search result display unit 219.

A query selection unit 815 determines, based on the association information accumulated in the external storage device 104 by the association information accumulation unit 211, whether there is a face image feature that is associated with the human body image feature for the human body image selected by the search result selection unit 814. In a case where the associated face image feature is stored in the external storage device 104, the face image feature is acquired from the external storage device 104. A plurality of human body images may be sorted out by the search result selection unit 814, and a plurality of face image features may be associated with a single human body image feature. As a result, a large number of face image features may be acquired. Accordingly, in such a case, one representative face image feature is sorted out from the face image features. In the case of sorting out the face image feature, clustering is performed on the face image feature and only the face image feature close to the center of gravity of each cluster is sorted out from each cluster. A face image search unit 813 designates the face image feature sorted out by the query selection unit 815 as a query and the face image search is performed using the face image feature stored in the external storage device 104 by the face image feature accumulation unit 207. Further, a face image with a similarity to a face image feature being higher than the predetermined threshold is identified as the search result. In the case of calculating the similarity, the sum total of distances of SIFT features at each facial feature point is obtained and the reciprocal number of the sum total of the distances is normalized to obtain the similarity.

A verification unit 817 determines whether there is a face image feature associated with the image of the search result obtained by the human body image search unit 216 based on the association information accumulated in the external storage device 104 by the association information accumulation unit 211. In a case where the associated face image feature is stored in the external storage device 104, the face image feature is acquired from the external storage device 104. Further, the similarity is obtained by comparing the face image features with the face image feature calculated from the face image of the query image. When the similarity is lower than the predetermined threshold TH3, the human body image including the human body image feature associated with the face image feature is deleted from the search result. The discrimination capability of the comparison of human body image features is lower than the discrimination capability of the comparison of face image features. Accordingly, the search result of the human body image is verified by comparing face image features. As the threshold TH3 used herein, a value that is equal to or less than the threshold TH2 used by the search result sorting unit 214 and is greater than a value at which a detection omission of the same human figure is reduced is set. While in the present embodiment, the human body image is deleted from the search result so that the verification result is reflected in the search result, correction processing can be performed to lower the similarity of the search result of the human body image. The similarity for the human body image search can be corrected by, for example, multiplying the similarity for the verification using face image features and the similarity for the human body image search.

An integration unit 818 integrates the face image search result and the human body image search result according to the first to third embodiments, integrates the attribute search result and the face image search result according to the third embodiment, and also integrates the results showing similar faces from the human body image search result, to update the search result. Since the discrimination capability of the comparison of human body image features is low, a large number of similar search results are acquired. Accordingly, only a representative result is held as the search result from among the results that seem to show the same person, i.e., results showing similar face image features. This leads to a reduction in redundancy of search results. The integration unit 818 determines whether there is a face image feature associated with the search result image obtained by the human body image search unit 216 based on the association information accumulated in the external storage device 104 by the association information accumulation unit 211. In a case where the associated face image feature is stored in the external storage device 104, the face image feature is acquired from the external storage device 104. Further, the similarity is obtained by comparing the face image features. When the similarity is higher than a predetermined threshold TH4, a result with a lower score for the human body image search among the human body image search results associated with the face image features is deleted from the search result. In this case, a high score representing a high likelihood of the same person is set as the threshold TH4.

Next, a processing procedure of an information processing apparatus 800 according to the present embodiment will be described in detail. The processing procedure of accumulating face image features and human body image features in the external storage device 104 is similar to that illustrated in FIG. 3.

Figure 9:
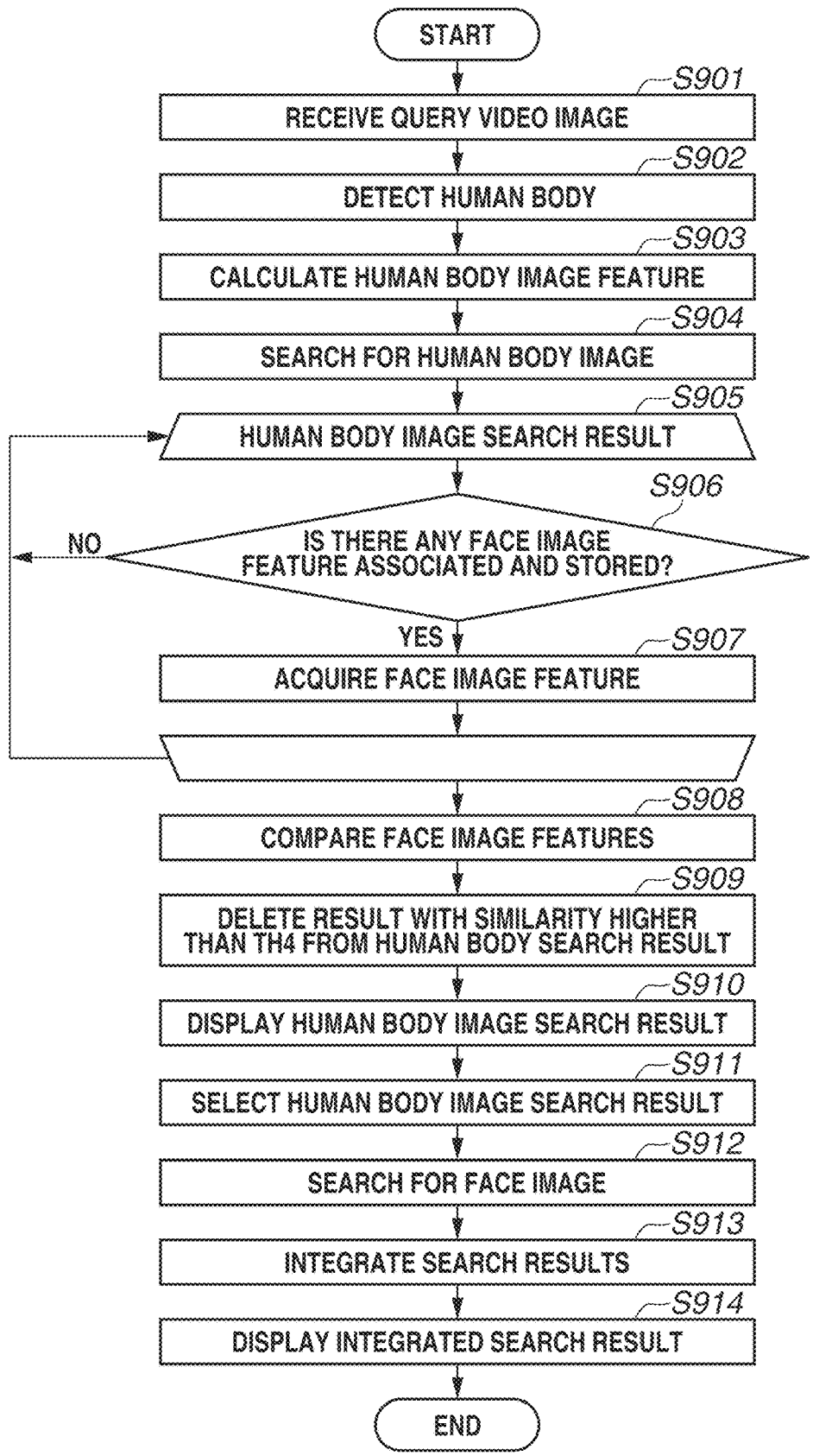
FIG. 9 is a flowchart illustrating an example of a processing procedure of searching for a face image and a human body image of a human figure according to the third embodiment.

A processing procedure of searching for a face image and a human body image of a human figure will be described below with reference to FIG. 9. FIG. 9 is a flowchart illustrating an example of the processing procedure of searching for a face image and a human body image of a human figure according to the present embodiment. This processing corresponds to the processing performed by the human body area detection unit 208, the human body image feature calculation unit 209, the query input unit 812 to the integration unit 818, and the search result display unit 219 illustrated in FIG. 6 described above, and thus the detailed description of the processing is omitted.

In step S901, the query input unit 212 receives a human body image used for search.

In step S902, the human body area detection unit 208 detects a human body area from the video image including the human body image received by the query input unit 212.

In step S903, the human body image feature calculation unit 209 calculates a human body image feature from the human body image detected in step S902.

In step S904, the human body image search unit 816 designates the human body image feature calculated in step S903 as a query and searches for a human body image by using the human body image feature stored in the external storage device 104 by the human body image feature accumulation unit 210. A human body image with a similarity to a human body image feature being equal to or higher than a predetermined threshold TH5 is identified as the search result.

Steps S905 to S909 are processing performed by the integration unit 818, and the processing is executed in a loop by a number of times equal to the number of human body images searched in step S904.

In step S906, the integration unit 818 determines, based on the association information accumulated in the external storage device 104, whether the face image feature associated with the human body image feature for the human body image to be processed is stored in the external storage device 104. As a result of the determination, in a case where the associated face image feature is not stored in the external storage device 104 (NO in step S906), the processing returns to step S905 to perform processing on the subsequent human body image. In a case where the associated face image feature is stored in the external storage device 104 (YES in step S906), the processing proceeds to step S907.

In step S907, the integration unit 1108 acquires face image features from the external storage device 104, and in step S908, the integration unit 1108 compares the face image features acquired in step S907. Further, in step S909, scores for search results of the human body image features associated with two face image features having a similarity higher than the threshold TH4 in the case of comparing the face image features are compared, and a result with a lower score is deleted from the search result.

In step S910, the search result display unit 219 displays, on the monitor 110, the search result of human body images that are searched in step S904 and integrated in steps S905 to S909, together with the face image.

In step S911, the search result selection unit 814 selects one or more human body images and face images from the human body image search result displayed on the monitor 110. In this processing, the user selects a human body image and a face image from the input device 109, and the search result selection unit 814 selects a human body image and a face image based on a user's instruction through the input device interface 105.

In step S912, the face image search unit 813 designates the face image feature associated with the face image set in step S911 as a query, and searches for a face image by using the face image feature stored in the external storage device 104 by the face image feature accumulation unit 207. Further, a face image with a similarity to a face image feature being equal to or higher than the predetermined threshold is identified as the search result.

In step S913, the integration unit 818 integrates the human body image search result obtained in step S904 with the face image search result obtained in step S912.

In this case, the human body image search result can be updated by limiting the installation location or image capturing time of each camera. Specifically, the search result can be updated by adding such a limitation that if it can be confirmed that a human figure to be searched is displayed on a certain camera, the human figure will not be displayed in close time periods on cameras installed at locations far from the camera. In this case, information about the location of each camera and time can be obtained from the face image selected in step S911, and thus a limitation on the range of search results of the human body image search can be added.

In step S914, the search result display unit 219 displays the search results integrated in step S913 on the monitor 110. If a plurality of results is obtained from the same camera, only the result showing a highest face image similarity can be displayed instead of displaying all the obtained results.

As described above, according to the present embodiment, when a human body image is given as a query, one or more body images are selected by the user from the human body image search result, and the face image search is performed using the face image features registered in association with the human body image features. In a case where the human body image search result is displayed for the user to select the next query, the face image features associated with the human body image feature of the search result are compared, and if there are similar faces, only the search result with a higher score for the human body image search is displayed as the search result. In this manner, a search result with a low discrimination capability, such as a human body image search result, is corrected by comparing face image features with a high discrimination capability, to allow the user to easily select a search result while reducing a redundant result display.

In the first to third embodiment, face image features and human body image features are extracted from images of a human figure in video images captured by surveillance cameras, and these features are associated and stored. In a fourth embodiment, attribute information and information about belongings and the like obtained by recognizing the image of the human figure are associated with the images and stored. In the case of search, a face image is searched based on attribute information given as a query. The user selects one or more face images from the face image search result using attributes, and the face image search is performed using the face image features. Further, one or more face images are selected by the user from the face image search result, and the human body image search is performed using the human body image features registered in association with the face image features. In this manner, the search is performed using other features associated with the search result in multiple stages.

The hardware configuration of the information processing apparatus according to the fourth embodiment is similar to that illustrated in FIG. 1, and thus the description thereof is omitted. A functional configuration of the information processing apparatus according to the present embodiment will be described below with reference to FIG. 10. Only differences between the present embodiment and the second embodiment will be described below.

Figure 10:
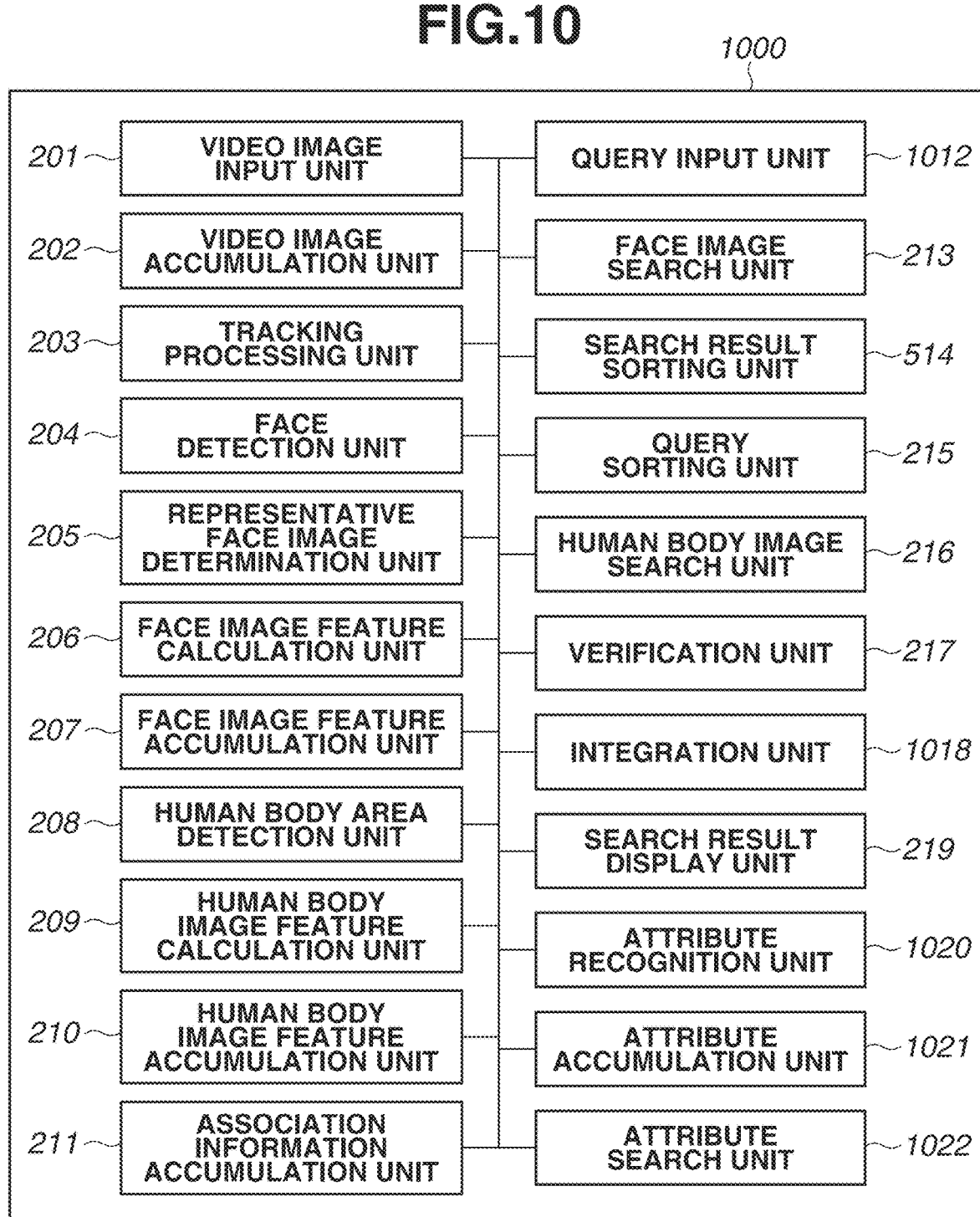
FIG. 10 is a block diagram illustrating a functional configuration example of an information processing apparatus according to a fourth embodiment.

FIG. 10 is a block diagram illustrating a functional configuration example of an information processing apparatus 1000 according to the fourth embodiment. The video image input unit 201 to the association information accumulation unit 211, the face image search unit 213, the search result selection unit 514, and the query sorting unit 215 to the search result display unit 219 are similar to those illustrated in FIG. 6 of the second embodiment, and thus descriptions thereof are omitted.

A query input unit 1012 designates (inputs) a face attribute and a human body attribute of a person used for search. Specifically, an item displayed for each attribute is selected. Designation of some attributes can be omitted, or a plurality of attributes can be selected for one attribute. The designation method is not limited to this method. The user can input data using a natural language and a natural language analysis can be performed to convert the data into an attribute.

An integration unit 1018 updates the search result by integrating the face image search result and the human body image search result according to the first embodiment and the second embodiment, and also integrating the search result of an attribute search unit 1022 with the search result of the face image search unit 213. To integrate the attribute and face results, when the attribute associated with the face image search result is different from the query, the attribute is deleted from the face image search result.

An attribute recognition unit 1020 recognizes the attributes of the face image and the human body image of the human figure. The attributes obtained from the face image include age, gender, race, hair style, presence or absence of glasses, and presence or absence of a mask. To recognize the face attributes, a publicly known technique discussed in Japanese Patent No. 6202937 can be used. Specifically, an attribute classifier is created by learning the face image feature calculated by the face image feature calculation unit 206 by using a support vector machine (SVM), and the attributes are recognized using the classifier. The attributes obtained from the human body image include the shape of clothes (blazer, sweater, pants, skirt, dress, etc.), the color or pattern of clothes, and belongings (shape, color). To recognize the shape, color, or pattern of clothes, a publicly known technique discussed in Z. Liu, P. Luo, S. Qiu, X. Wang, X. Tang. "Deepfashion: Powering robust clothes recognition and retrieval with richannotations". Proceedings of IEEE Conference on Computer Vision and Pattern Recognition (CVPR). 2016 can be used. To recognize belongings, a publicly known technique discussed in Shaoqing Ren, Kaiming He, Ross Girshick, Jian Sun: "Faster R-CNN: Towards real-time object detection with region proposal networks." Computer Vision and Pattern Recognition 2015 can be used. According to these techniques, an attribute classifier is created by learning features calculated from a human body image using deep learning, and the attributes are recognized using the classifier.

An attribute accumulation unit 1021 stores the face attribute and the human body attribute that are recognized by the attribute recognition unit 1020 in the external storage device 104. In addition, as metadata for the attributes, information such as a human figure ID, a tracking track ID used when a human figure is tracked, an image capturing time, and an image capturing camera is stored in association with the face image feature.

The attribute search unit 1022 searches for the face image that matches the attribute stored in the external storage device 104 by the attribute accumulation unit 1021 based on attribute information given as a query. Further, the face image features of the search result are compared and a face image with a similarity to a face image feature being equal to or higher than the predetermined threshold TH1 is identified as the search result. In the case of calculating the similarity, the sum total of distances of SIFT features at each facial feature point is obtained and the reciprocal number of the sum total of the distances is normalized to thereby obtain the similarity.

Next, the processing procedure of the information processing apparatus 1000 according to the present embodiment will be described.

Next, the processing of accumulating the video image data input from the video image input unit 201 in such a manner that the video image data can be searched will be described in detail with reference to FIG. 11.

Figure 11:
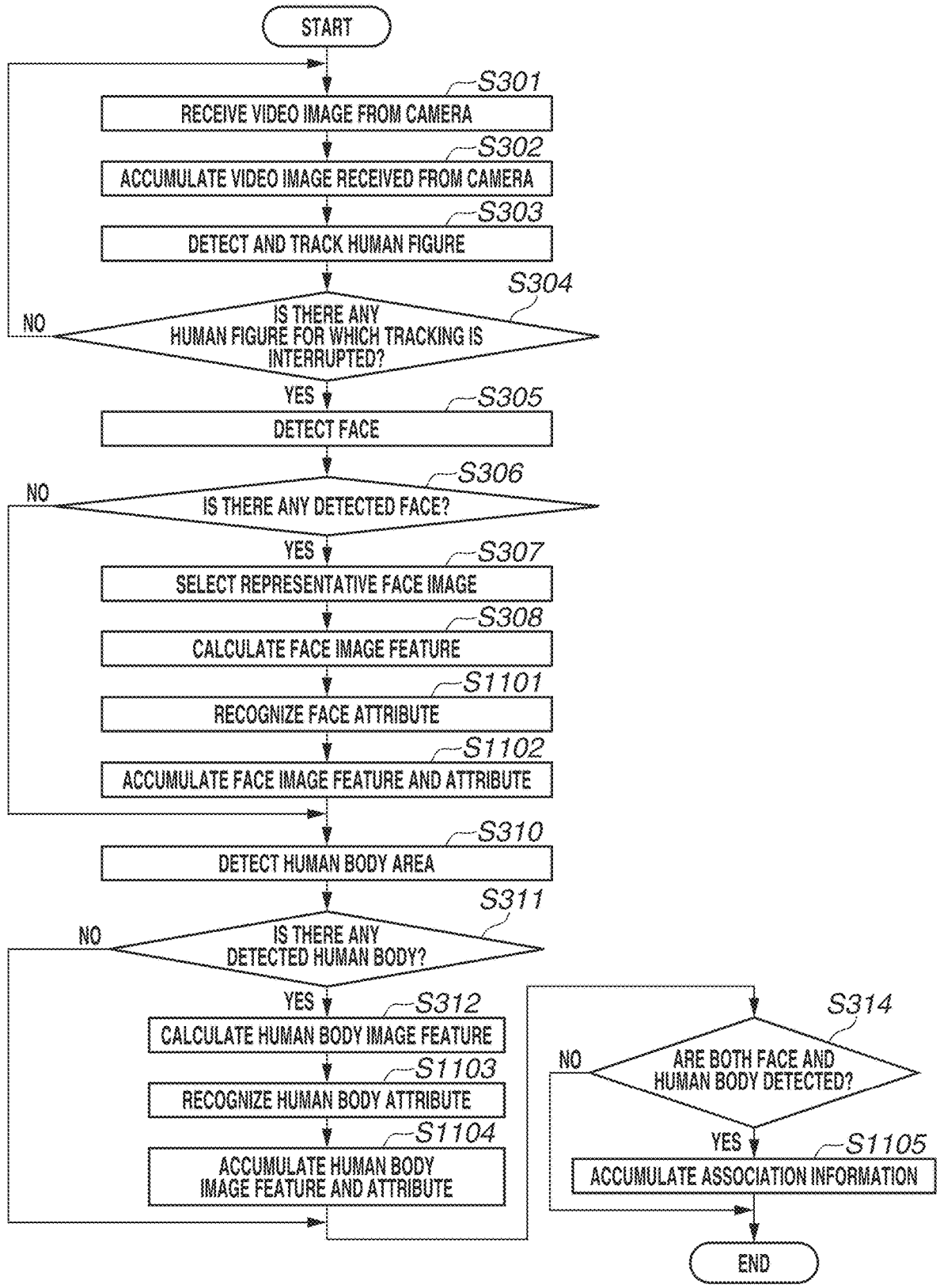
FIG. 11 is a flowchart illustrating an example of a processing procedure of accumulating face image features, human body image features, and attributes according to the fourth embodiment.

FIG. 11 is a flowchart illustrating an example of the processing procedure of accumulating face image features, human body image features, and attributes according to the present embodiment. This processing corresponds to the processing performed by the video image input unit 201 to the association information accumulation unit 211, the attribute recognition unit 1020, and the attribute accumulation unit 1021 described above, and the detailed description of the processing is omitted.

Steps S301 to S308 illustrated in FIG. 11 are respectively similar to steps S301 to S308 illustrated in FIG. 3.

In step S1101, the attribute recognition unit 1020 extracts an attribute from the face image.

In step S1102, the face image feature accumulation unit 207 stores the face image feature calculated in step S308 in the external storage device 104 and stores the face attribute extracted in step S1101 by the attribute accumulation unit 1021 in the external storage device 104. In addition, as metadata for the face image feature and the face attribute, information such as a human figure ID, a tracking track ID used when a human figure is tracked, an image capturing time, and an image capturing camera is stored in association with the face image feature and the face attribute.

Steps S310 to S312 illustrated in FIG. 11 are respectively similar to steps S310 to S312 illustrated in FIG. 3.

In step S1103, the attribute recognition unit 1020 extracts an attribute from the human body image.

In step S1104, the human body image feature accumulation unit 210 stores the face image feature calculated in step S312 in the external storage device 104 and stores the human body attribute extracted in step S1103 by the attribute accumulation unit 1021 in the external storage device 104. In addition, as metadata for the human body image feature and the human body attribute, information such as a human figure ID, a tracking track ID used when a human figure is tracked, an image capturing time, and an image capturing camera is stored in association with the human body image feature and the human body attribute.

Step S314 illustrated in FIG. 11 is similar to step S314 illustrated in FIG. 3.

In step S1105, the association information accumulation unit 211 stores, in the external storage device 104, the association information that associates the face image feature, the human body image feature, the face attribute, and the human body attribute which are calculated from the same human figure, and then terminates the processing.

A processing procedure of searching for a face image feature and a human body image feature of a human figure will be described below with reference to FIG. 12. This processing corresponds to the processing performed by the query input unit 1012, the face image search unit 213, the search result selection unit 514, the query sorting unit 215 to the search result display unit 219, the search result selection unit 514, and the attribute search unit 1022 illustrated in FIG. 10 described above, and the detailed description of the processing is omitted.

Figure 12B:
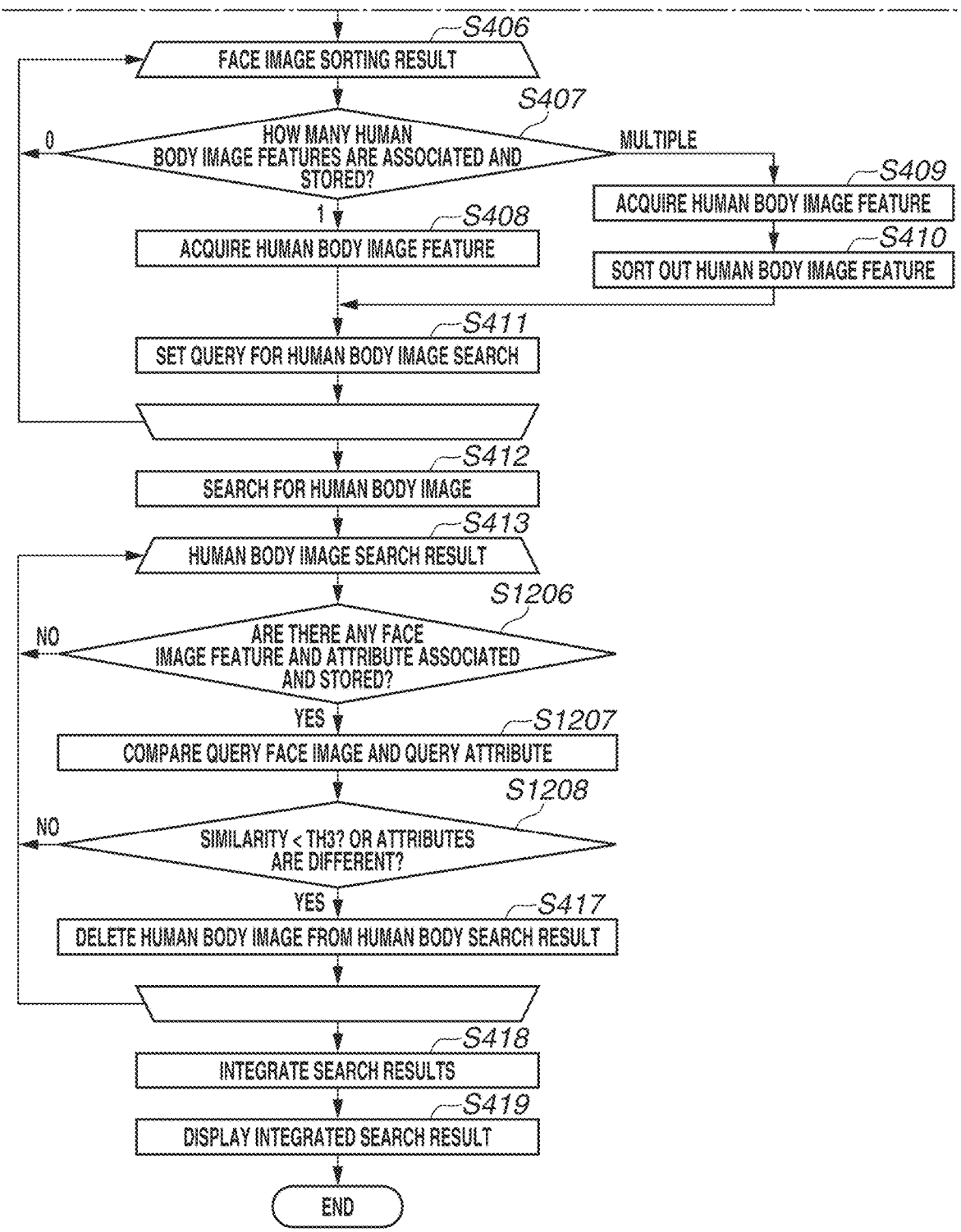
FIG. 12 is a diagram including the flowcharts of FIGS. 12A and 12B illustrating an example of a processing procedure of searching for an attribute, a face image, and a human body image of a human figure according to the fourth embodiment.

FIG. 12 is a flowchart illustrating an example of the processing procedure of searching for a face image and a human body image of a human figure according to the present embodiment.

In step S1201, the query input unit 1012 designates (inputs) a face attribute and a human body attribute of a person used for search.

In step S1202, the attribute search unit 1022 searches for the face image that matches the attribute stored in the external storage device 104 by the attribute accumulation unit 1021 based on attribute information given as a query.

When a plurality of images of the same human figure is registered, a plurality of results for the same human figure is output in the attribute search. To avoid this, the processing of steps S905 to S909 according to the third embodiment can be carried out. Specifically, the face image features of the search result can be compared and if there is a face image with a similarity to a face image feature being equal to or higher than the predetermined threshold TH4, one of the compared face image features can be deleted from the attribute search result. In the case of calculating the similarity, the sum total of distances of SIFT features at each facial feature point is obtained and the reciprocal number of the sum total of the distances is normalized, to obtain the similarity.

In step S1203, the search result display unit 219 displays the face image search result obtained in step S1202 on the monitor 110.

In step S1204, the search result selection unit 514 selects one or more face images from the face image search result displayed on the monitor 110. In this processing, the user selects a face image from the input device 109 and the search result selection unit 514 selects a face image based on a user's instruction through the input device interface 105.

Step S404 illustrated in FIG. 12 is similar to step S404 illustrated in FIG. 7.

In step S1205, the integration unit 218 integrates the search result of the attribute search in step S1202 with the search result of the face image search in step S404.

Steps S701 to S413 illustrated in FIG. 12 are respectively similar to steps S701 to S413 illustrated in FIG. 7.

In step S1206, the verification unit 217 determines, based on the association information accumulated in the external storage device 104, whether the face image feature associated with the human body image feature for the human body image to be processed is stored in the external storage device 104. The verification unit 217 also determines whether the attribute information associated with the human body image feature for the human body image to be processed is stored in the external storage device 104. As a result of the determination, in a case where both the associated face image feature and the associated attribute information are not stored in the external storage device 104 (NO in step S1206), the processing returns to step S413 to perform processing on the subsequent human body image. In a case where one of the associated face image feature and the associated attribute information is stored in the external storage device 104 (YES in step S1206), the processing proceeds to step S1207.

In step S1207, in a case where the face image feature is stored, the verification unit 217 acquires the face image feature from the external storage device 104 and compares the acquired face image feature with the face image feature of the query of the face image search selected in step S1204, to obtain the similarity. In a case where the attribute information is stored, the attribute information is acquired from the external storage device 104, and the acquired attribute information is compared with the attribute information input in step S1201.

In step S1208, the verification unit 217 determines whether the similarity calculated in step S1207 is lower than the predetermined threshold TH3, or whether the attribute information is identical. As a result of the determination, in a case where the similarity is equal to or higher than the predetermined threshold TH3 and the attribute information is identical (NO in step S1208), the processing returns to step S413 to perform processing on the subsequent human body image. In a case where the similarity is lower than the predetermined threshold TH3, or if the attributes are different, the processing proceeds to step S417.

Steps S417 to S419 illustrated in FIG. 12 are respectively similar to steps S404 to S413 illustrated in FIG. 7.

As described above, according to the present embodiment, face image features and human body image features are extracted from a human figure image in video images captured by surveillance cameras, and attribute information and information about belongings and the like obtained by recognizing the human figure image are extracted, and then these features are associated with the images and stored. In the case of search, a face image is searched based on attribute information given as a query. The user selects one or more face images from the face image search result using the attribute, and the face image search is performed using the face image features. Further, the user selects one or more face images from the face image search result, and the human body image search is performed using the human body image features registered in association with the face image features. In this manner, the search is performed using other features associated with the search result in multiple stages. With this configuration, the face image search and the human body image search can be performed when attribute information is given as a query.

In the present embodiment, three-stage search processing is carried out using face image features, human body image features, and attribute information, but the present disclosure is not limited to this processing. A gait feature, a vehicle, an operation, and the like can also be used as fourth, fifth, and sixth features. In the present embodiment, all the attribute information is collectively treated. Alternatively, the attributes obtained from a face image, and the attributes obtained from a human body image, such as belongings, can be treated as separate features. These features can be combined in multiple stages for search. Further, features of one's company can also be combined in multiple stages for search.

In the first to fourth embodiments, face image features and body image features are extracted from a series of images of the same human figure obtained by tracking the human figure in video images captured by surveillance cameras, and these features are associated and stored. In a fifth embodiment, when a face image and a human body image of a human figure are obtained from frame images of video images captured by surveillance camera without tracking the human figure, face image features and human body image features are associated and stored.

The hardware configuration of the information processing apparatus according to the fifth embodiment is similar to that illustrated in FIG. 1, and thus the description thereof is omitted. A functional configuration of the information processing apparatus according to the present embodiment will be described with reference to FIG. 13. Only differences between the present embodiment and the second embodiment will be described below.

Figure 13:
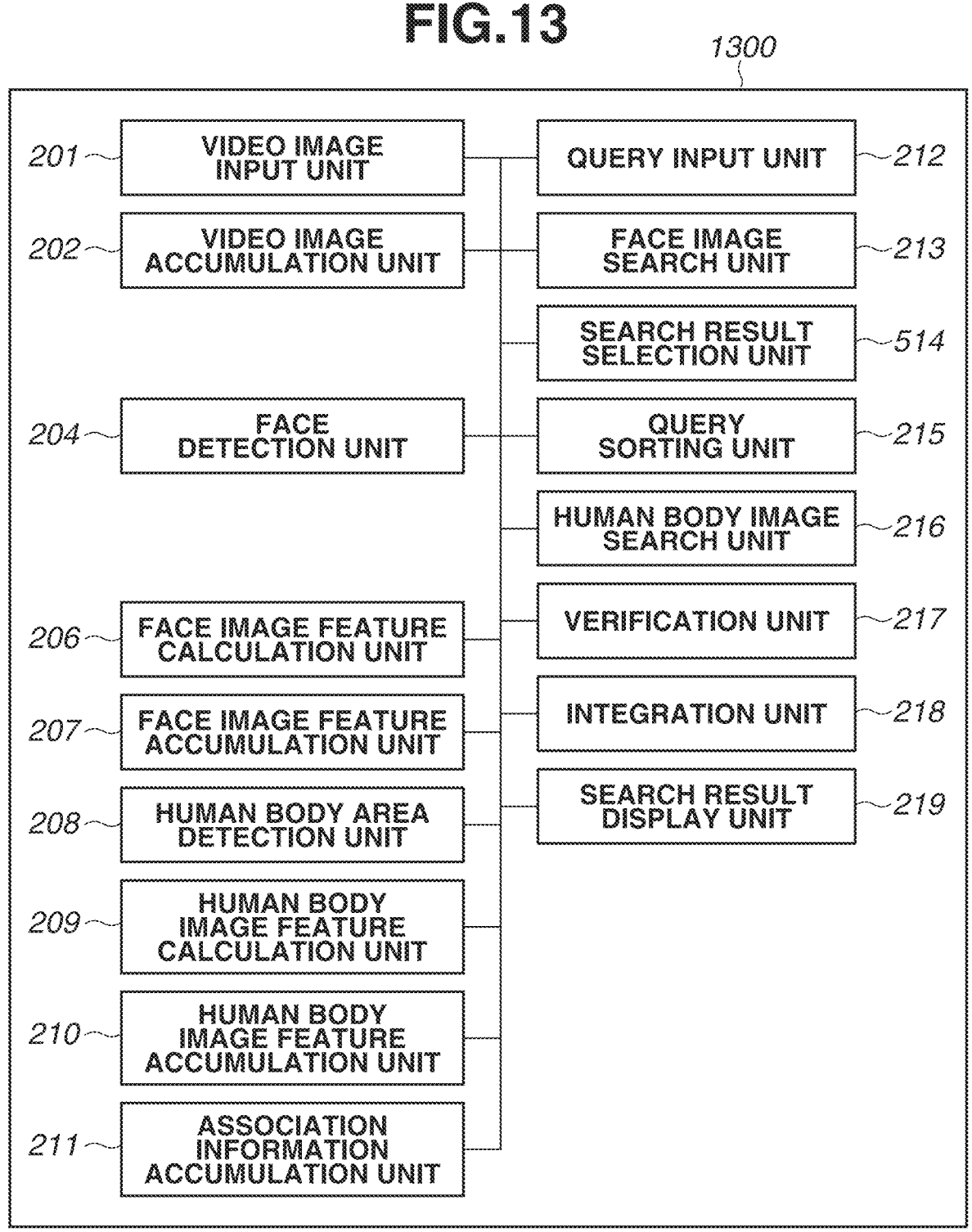
FIG. 13 is a block diagram illustrating a functional configuration example of an information processing apparatus according to a fifth embodiment.

FIG. 13 is a block diagram illustrating a functional configuration example of an information processing apparatus 1300 according to the fifth embodiment. This configuration corresponds to the configuration in which the tracking processing unit 203 and the representative face image determination unit 205 are omitted from the configuration illustrated in FIG. 6.

The face detection unit 204 directly performs the face detection from frame images of the video image received by the video image input unit 201. In the present embodiment, instead of selecting a representative face image, the face image feature calculation unit 206 calculates face image features for all face images detected by the face detection unit 204. The human body area detection unit 208 directly performs the human body area detection from frame images of the video image received by the video image input unit 201.

Next, the processing procedure of the information processing apparatus 1300 according to the present embodiment will be described in detail. The processing procedure of searching for a face image and a human body image of a human figure is similar to that illustrated in FIG. 7, and thus the description thereof is omitted. The processing procedure of accumulating face image features and human body image features in the external storage device 104 will be described with reference to FIG. 14.

Figure 14:
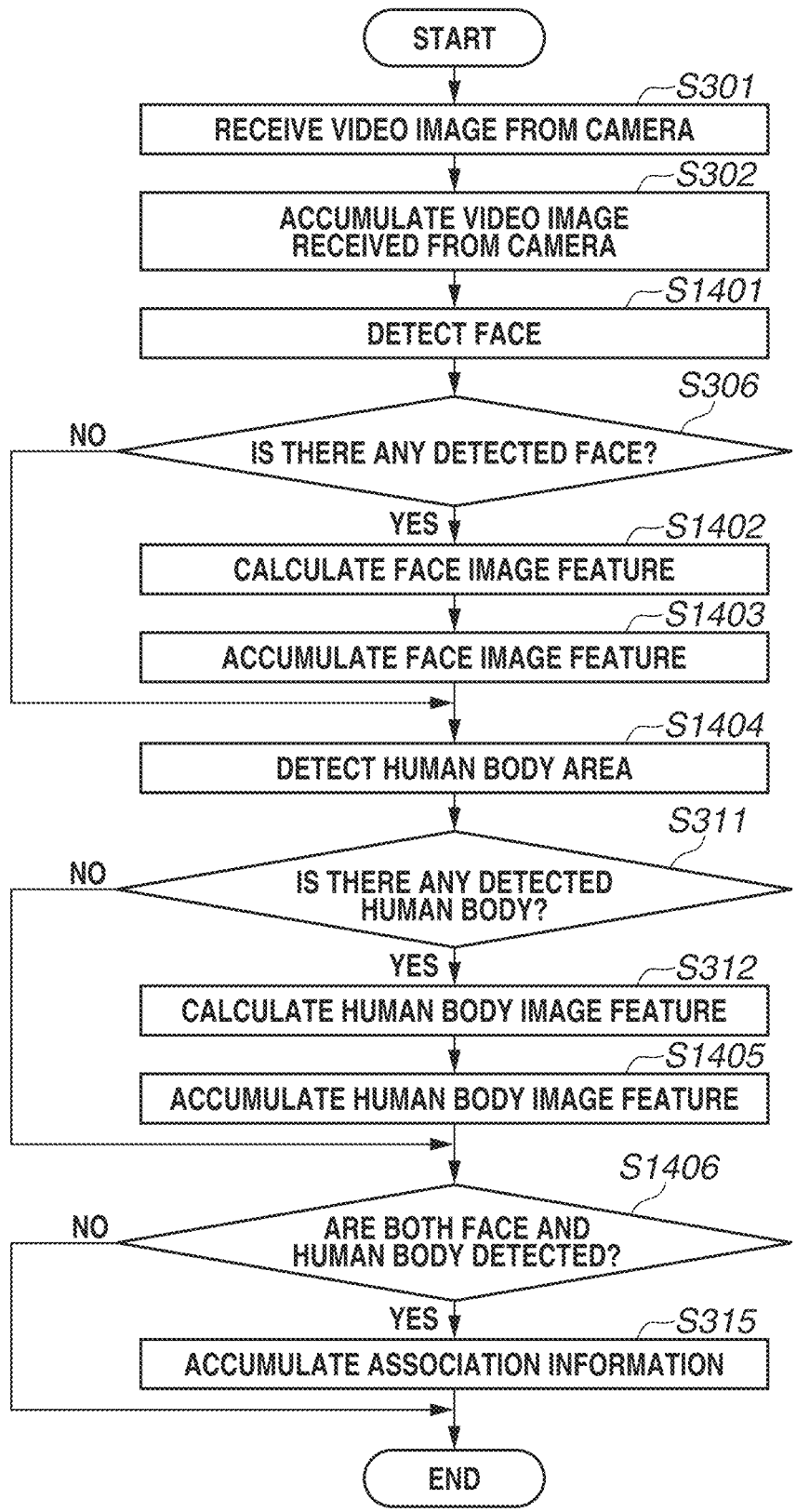
FIG. 14 is a flowchart illustrating an example of a processing procedure of accumulating face image features and human body image features according to the fifth embodiment.

FIG. 14 is a flowchart illustrating an example of the processing procedure of accumulating face image features and human body image features in the external storage device 104 according to the present embodiment.

First, steps S301 to S302 are respectively similar to steps S301 to S302 illustrated in FIG. 3.

In step S1401, the face detection unit 204 directly performs the face detection from frame images of the video image received by the video image input unit 201. The subsequent step S306 is similar to step S306 illustrated in FIG. 3. In a case where there is a detected face (YES in step S306), the processing proceeds to step S1402.

In step S1402, the face image feature calculation unit 206 calculates face image features from the face image detected in step S1401.

In step S1403, the face image feature accumulation unit 207 stores the face image features calculated in step S1401 in the external storage device 104. In addition, as metadata for the face image features, information such as a human figure ID, an image capturing time, and an image capturing camera is stored in association with the face image features. In the present embodiment, tracking processing is not carried out, and thus a tracking track ID is not included in the metadata.

In step S1404, the human body area detection unit 208 directly performs the human body area detection from frame images of the video image received by the video image input unit 201. Steps S311 to S312 are respectively similar to steps S311 to S312 illustrated in FIG. 3.

In step S1405, the human body image feature accumulation unit 210 stores the human body image features calculated in step S312 in the external storage device 104. In addition, as metadata for the human body image features, information such as a human figure ID, an image capturing time, and an image capturing camera is stored in association with the human body image features. In the present embodiment, tracking processing is not carried out, and thus a tracking track ID is not included in the metadata.

In step S1406, the association information accumulation unit 211 determines whether there is combination of the face detected in step S1401 and the human body detected in step S1404 that matches the human figure. For example, it is comprehensively determined whether the detected face and body match the human figure based on information, such as the human figure ID, the image capturing time, and the image capturing camera, by referring to the metadata for the face image features and the human body image features. As a result of the determination, in a case where there is a combination that matches the human figure (YES in step S1406), the processing proceeds to step S315. In a case where there is no combination that matches the human figure (NO in step S1406), the processing is terminated. Step S315 is similar to step S315 illustrated in FIG. 3.

As described above, according to the present embodiment, when a face image and a human body image of a human figure are obtained from frame images of video images captured by surveillance camera without tracking the human figure, face image features and human body image features are associated and stored. In the case of tracking the human figure, video images with a high frame rate are required. However, the present embodiment eliminates the need for video images with a high frame rate, which leads to a reduction in video image analysis processing and network load. A similar search can be performed by extracting a plurality of feature amounts from one still image.

In the first to third embodiments described above, face image features and human body image features are extracted from an image of a human figure captured by one camera, and these features are associated and stored. On the other hand, when a plurality of surveillance camera is installed, images of the same place may be captured by the cameras in overlapping visual fields. In this case, a plurality of video images is obtained for the same place. Specifically, when a human figure is present at the place, images such as a video image captured from the front side, a video image captured from the back side, a video image including a clear face, and a video image in which a face image is blurred while the entire body image is clear may be obtained. It is possible to identify human figures included in the video images as the same human figure by using the principle of triangulation. Accordingly, face image features and human body image features of the same human figure obtained from a plurality of cameras can be associated and stored. With this configuration, face image features and human body image features can be more accurately associated with images with different angles of view.

The use of an inter-camera human figure tracking technique as described in M. Farenzena et. al. makes it possible to identify the same human figure among the images captured by a plurality of cameras. Also, in this case, the association information accumulation unit 211 can store the face image features and the human body image features of the same human figure obtained from the plurality of cameras in such a manner that the features are associated with each other. Human figure images in face images and human body images obtained from different cameras can be identified as images of the same human figure. Accordingly, if a part of the images can be searched, a series of images can be regarded as images of the same human figure. Thus, the detection rate from various cameras can be increased.

The embodiments described above illustrate an example of detecting a human figure as an object, and a face image is used as a feature with a high discrimination capability and a human body image is used as a feature with a low discrimination capability. However, in the present disclosure, the object is not limited to a human figure. For example, the present disclosure may be applied to an animal such as a dog or cat, or a vehicle such as a car. When the present disclosure is applied to an animal, a face image, a body pattern, or clothes can be used as a feature with a high discrimination capability, and the entire shape or color can be used as a feature with a low discrimination capability. When the present disclosure is applied to a car, an image of an area in the periphery of an identification number can be used as a feature with a high discrimination capability, and the entire shape or color can be used as a feature with a low discrimination capability. The present disclosure is not limited to the case of searching for an object identical to an object included in a query image, but instead can be applied to a structure for searching for similar objects. For example, if an animal is set as an object, an animal that is not identical to the animal but is of the same type as the animal can be searched. If a car is set as an object, a car that is not identical to the car but is, for example, of the same type and color as the car can be searched.

The present disclosure can also be implemented in such a manner that a program for implementing one or more functions according to the embodiments described above is supplied to a system or apparatus via a network or recording medium and one or more processors in a computer of the system or apparatus reads and executes the program. The present disclosure can also be implemented by a circuit (e.g., an application specific integrated circuit (ASIC)) for implementing one or more functions according to the embodiments described above.

According to the present disclosure, it is possible to accurately search for an object of interest by effectively combining features of the object.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2017-101743, filed May 23, 2017, which is hereby incorporated by reference herein in its entirety.

What is claimed is:

1. An information processing apparatus comprising:
    a first acquisition unit configured to acquire a first feature from a search source image including a search object;
    a first search unit configured to search for the search object from a plurality of video images based on the first feature acquired by the first acquisition unit;
    a second acquisition unit configured to acquire a second feature from the search object searched by the first search unit, wherein the second feature is different from the first feature; and
    a second search unit configured to search, based on the second feature acquired by the second acquisition unit, the search object from a video image, among the plurality of video images, in which the search object is not searched by at least the first search unit.

2. The information processing apparatus according to claim 1, wherein the second search unit updates a search result of the first search unit by integrating a search result of the second search unit with the search result of the first search unit.

3. The information processing apparatus according to claim 2, further comprising:
    a generation unit configured to generate a transformation between a first similarity score calculated based on the first feature and a second similarity score calculated based on the second feature by using the first and second similarity scores; and
    a first calculation unit configured to calculate, by using the transformation, one of a similarity score of the first feature and a similarity score of the second feature that is not calculated by one of the first search unit and the second search unit, for the search object searched using one of the search result of the first search unit and the search result of the second search unit,
    wherein the second search unit updates the search result of the first search unit by using at least one of the similarity score of the first feature or the similarity score of the second feature.

4. The information processing apparatus according to claim 3, further comprising:
    a first comparison unit configured to calculate the similarity score of the first feature in a case where the first feature associated with the search object that is not searched by the first search unit is included in the search result of the second search unit; and
    a second comparison unit configured to calculate the similarity score of the second feature in a case where the second feature associated with the search object that is not searched by the second search unit is included in the search result of the first search unit.

5. The information processing apparatus according to claim 4, wherein the generation unit generates the transformation by using the similarity score of the first feature calculated by the first comparison unit and the similarity score of the second feature calculated by the second comparison unit.

6. The information processing apparatus according to claim 3, wherein the generation unit generates the transformation by generating a scatter diagram and an approximation between the similarity score of the first feature and the similarity score of the second feature.

7. The information processing apparatus according to claim 3, further comprising a second calculation unit configured to calculate an integrated similarity score by using the similarity score of the first feature and the similarity score of the second feature,
wherein the second search unit updates the search result of the first search unit by using the integrated similarity score.

8. The information processing apparatus according to claim 3, wherein the second search unit updates the search result of the first search unit by using the similarity score of one of the first feature and the second feature with higher discriminability.

9. The information processing apparatus according to claim 2, further comprising a display unit configured to display an image representing the search result of the first search unit on a display device,
wherein the search result of the first search unit is updated by the second search unit.

10. The information processing apparatus according to claim 9, wherein the display unit displays the search result of the first search unit and the search result of the second search unit in different display modes.

11. The information processing apparatus according to claim 9, wherein the display unit displays the search result of the first search unit on a display device that is different from a display device on which the display unit displays the search result of the second search unit.

12. The information processing apparatus according to claim 9, wherein the display unit is configured to switch between a first mode for displaying the search result of the first search unit and the search result of the second search unit on the same display device and a second mode for displaying the search result of the first search unit and the search result of the second search unit on different display devices.

13. The information processing apparatus according to claim 1, wherein the first search unit searches for the search object by using a feature with a similarity to the first feature acquired by the first acquisition unit being equal to or higher than a threshold.

14. The information processing apparatus according to claim 1, wherein the first search unit uses a feature designated by a user from a search result of the first search unit.

15. The information processing apparatus according to claim 1, further comprising a storage unit configured to store the first feature, the second feature, and a video image in such a manner that the first feature, the second feature, and the video image are associated with at least one of an acquisition location of the video image or an acquisition time of the video image.

16. The information processing apparatus according to claim 15, wherein the second search unit searches for the search object based on at least one of the acquisition location and/or acquisition information which are associated with the second feature acquired by the second acquisition unit.

17. The information processing apparatus according to claim 15, wherein the second search unit updates a search result of the first search unit based on at least one of the acquisition location or acquisition information which are associated with the second feature.

18. The information processing apparatus according to claim 17, wherein the second search unit searches for the search object by using a third feature different from each of the first feature and the second feature, and updates the search result of the first search unit by using a search result of the second search unit.

19. The information processing apparatus according to claim 15, wherein the storage unit stores the first feature and the second feature which are associated with a tracked search object.

20. The information processing apparatus according to claim 19, wherein the storage unit stores the first feature and the second feature which are associated with each other based on images obtained from a plurality of cameras installed in such a manner that visual fields of the plurality of cameras overlap each other.

21. The information processing apparatus according to claim 1, further comprising:
a third acquisition unit configured to acquire, from a storage unit, the first feature associated with the second feature; and
a verification unit configured to verify a search result of the second search unit by comparing the first feature acquired by the third acquisition unit with the first feature acquired by the first acquisition unit.

22. The information processing apparatus according to claim 21, wherein, in a case where a similarity between the first feature acquired by the third acquisition unit and the first feature acquired by the search source image is lower than a first similarity threshold, the verification unit deletes the second feature from the search result of the second search unit.

23. The information processing apparatus according to claim 22, further comprising a comparison unit configured to compare second features acquired by the second acquisition unit in a case where discriminability of the second feature is higher than a discriminability threshold,
wherein, in a case where a similarity calculated by the comparison unit is higher than a second similarity threshold, the verification unit deletes the first feature associated with one of the second features from the search result of the first search unit.

24. The information processing apparatus according to claim 1, wherein the search object is a human figure.

25. The information processing apparatus according to claim 24, wherein each of the first feature and the second feature is one of a feature obtained from the following: a face image, a feature obtained from a human body image, a feature obtained from belongings of a human figure, and an attribute obtained from a human figure.

26. A method for an information processing apparatus, the method comprising:
acquiring, as a first acquisition, a first feature from a search source image including a search object;
searching, as a first search, for the search object from a plurality of video images based on the first feature acquired by the first acquisition;
acquiring, as a second acquisition, a second feature from the search object searched by the first search, wherein the second feature is different from the first feature; and
searching, as a second search based on the second feature acquired by the second acquisition, the search object from a video image, among the plurality of video images, in which the search object is not searched by at least the first search.

27. A non-transitory computer-readable storage medium storing a program to cause a computer to perform a method for an information processing apparatus, the method comprising:
   acquiring, as a first acquisition, a first feature from a search source image including a search object;
   searching, as a first search, for the search object from a plurality of video images based on the first feature acquired by the first acquisition;
   acquiring, as a second acquisition, a second feature from the search object searched by the first search, wherein the second feature is different from the first feature; and
   searching, as a second search based on the second feature acquired by the second acquisition, the search object from a video image, among the plurality of video images, in which the search object is not searched by at least the first search.

\* \* \* \* \*